F. W. LAENCHER.
BOX MAKING MACHINE.
APPLICATION FILED APR. 5, 1916.
1,280,248.
Patented Oct. 1, 1918.
29 SHEETS—SHEET 11.
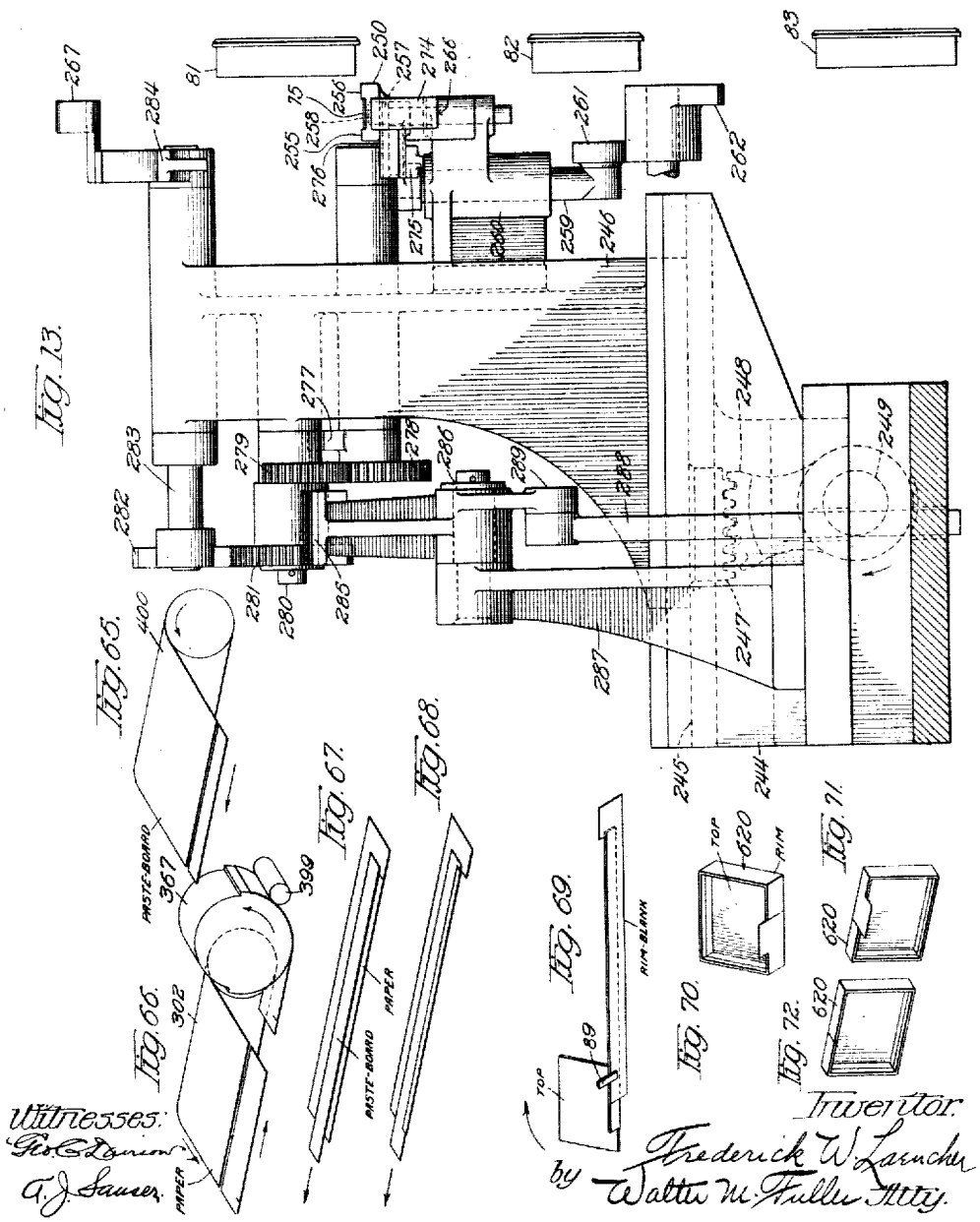

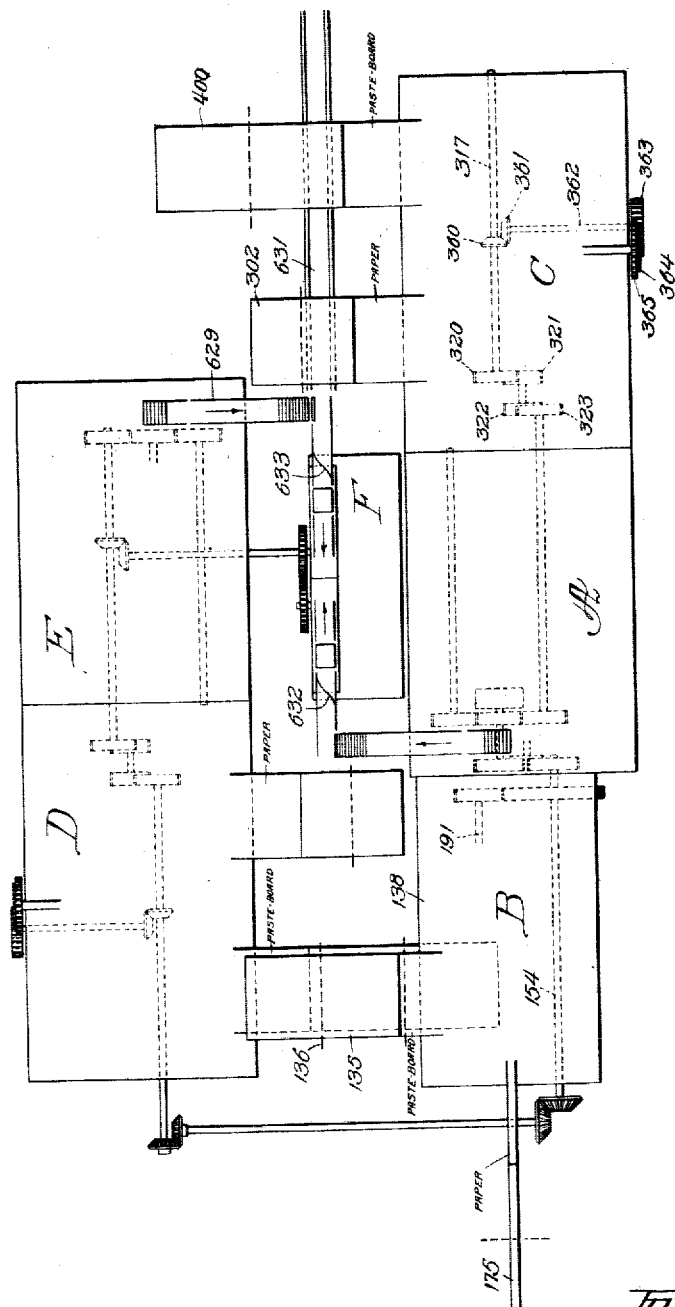

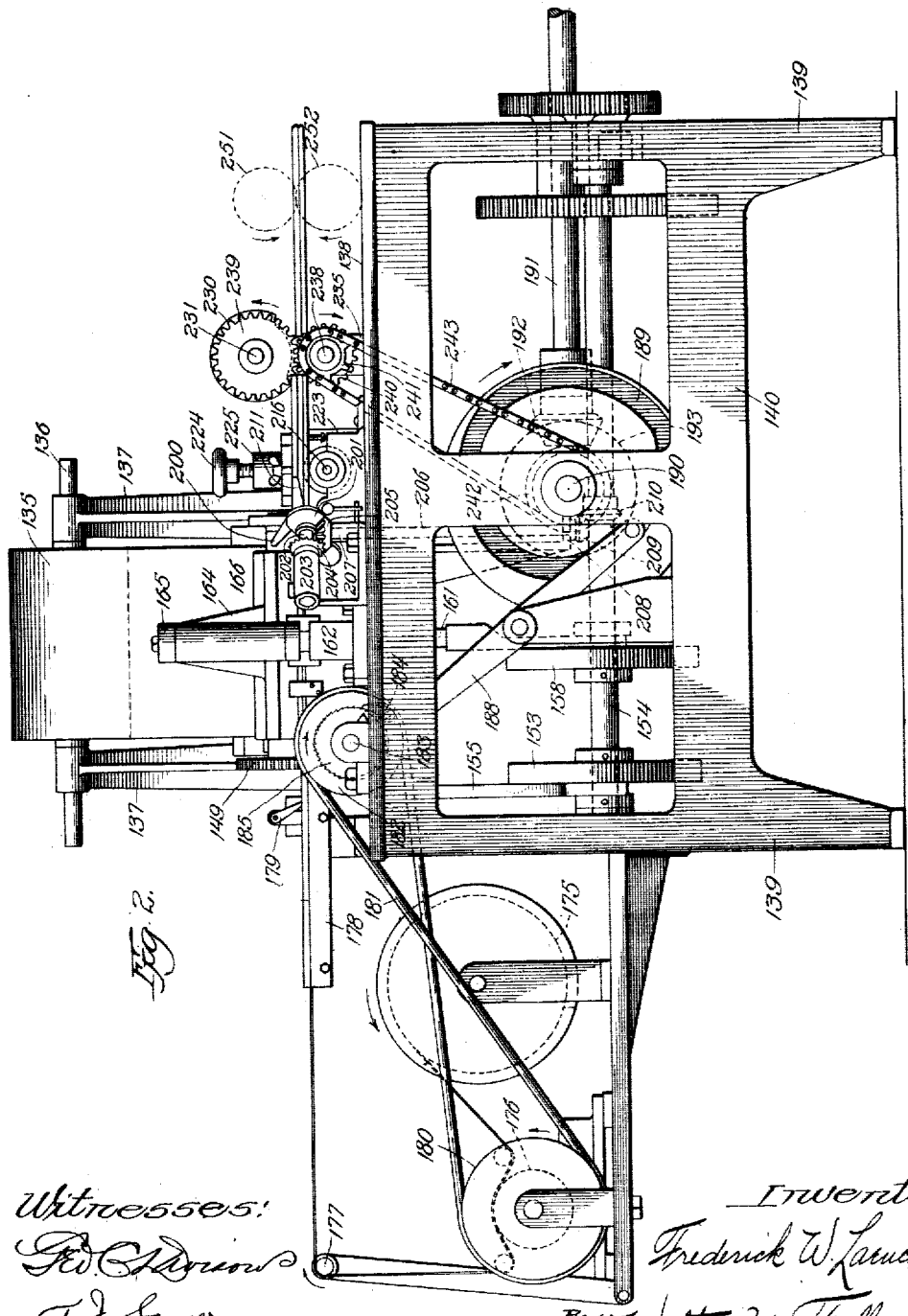

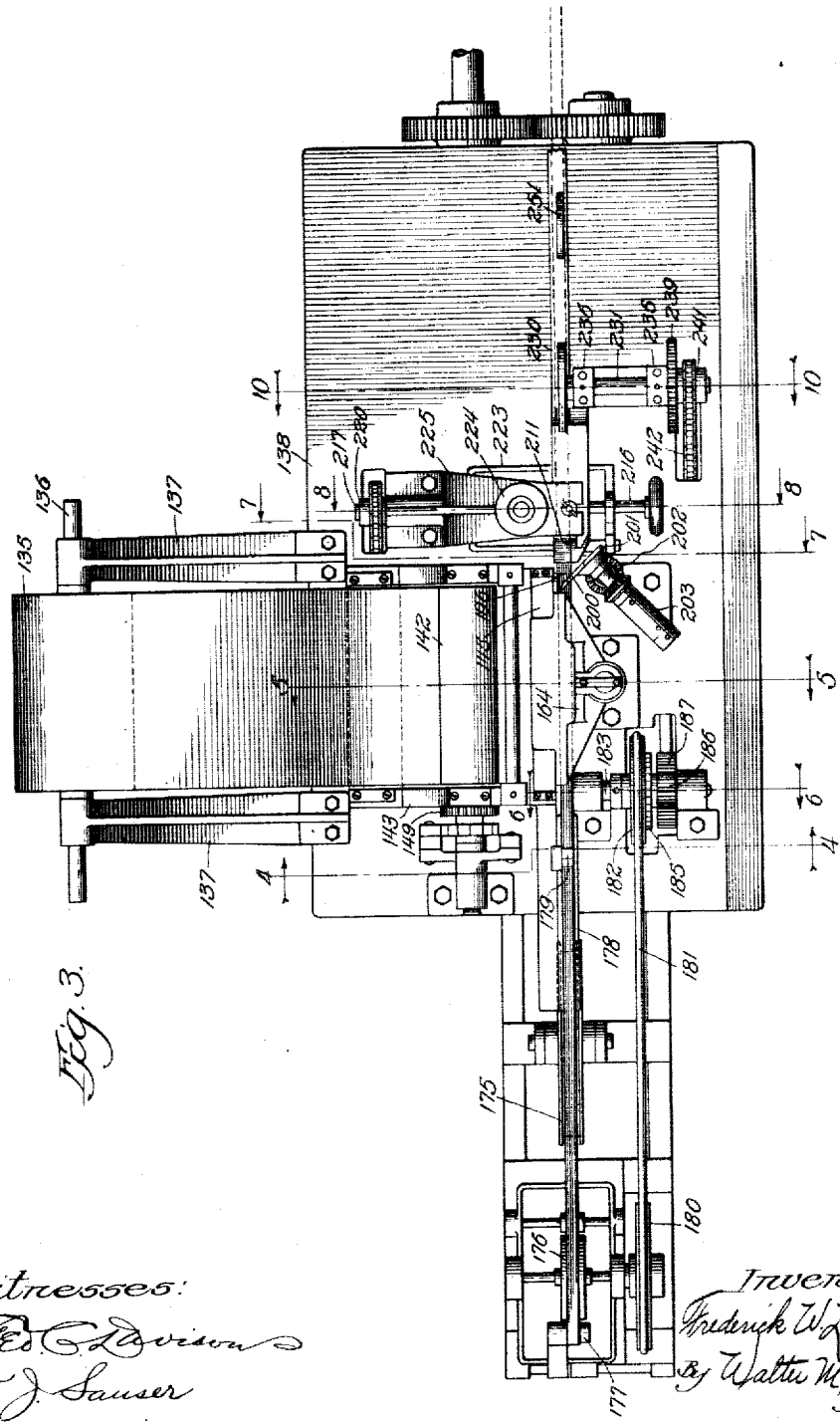

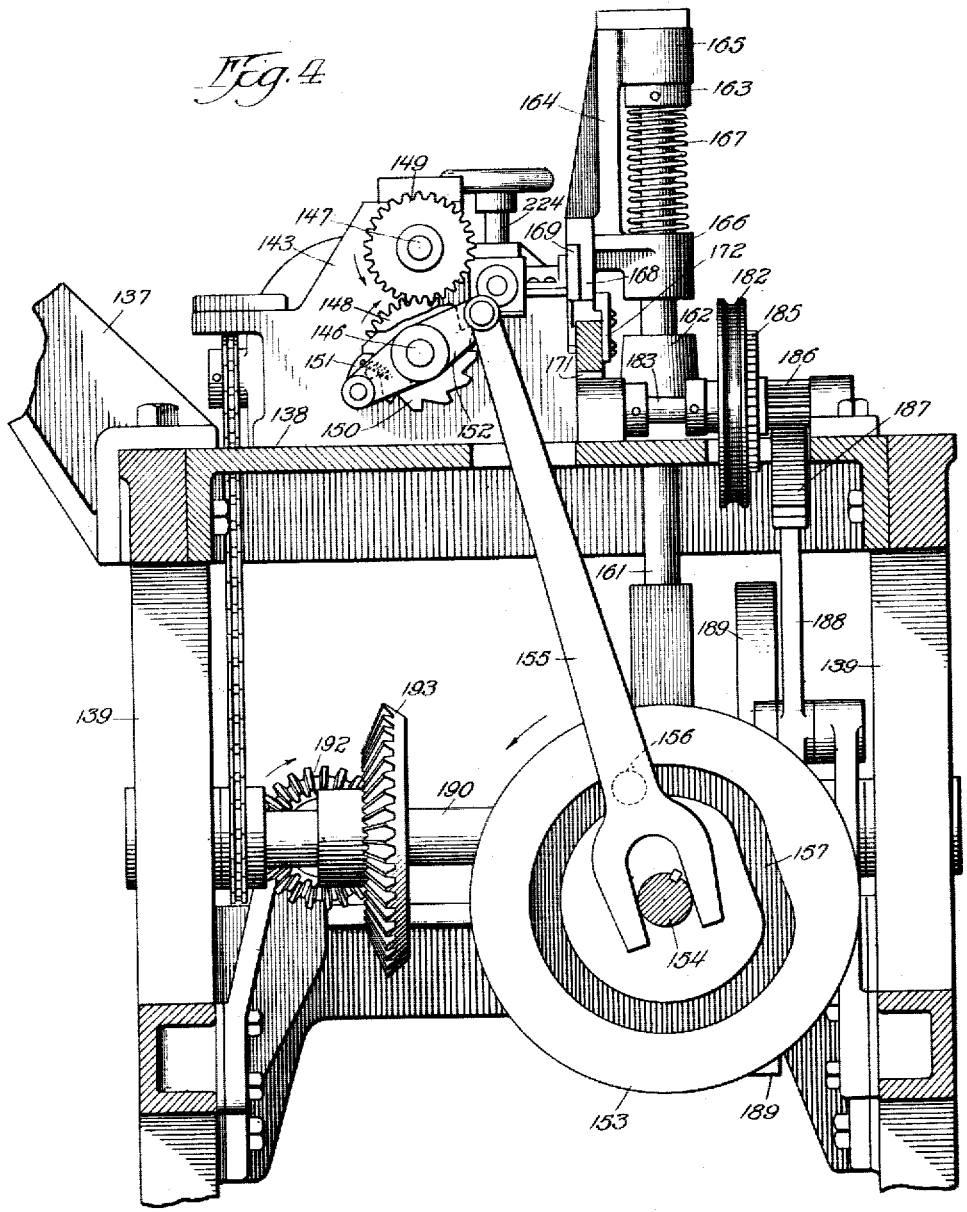

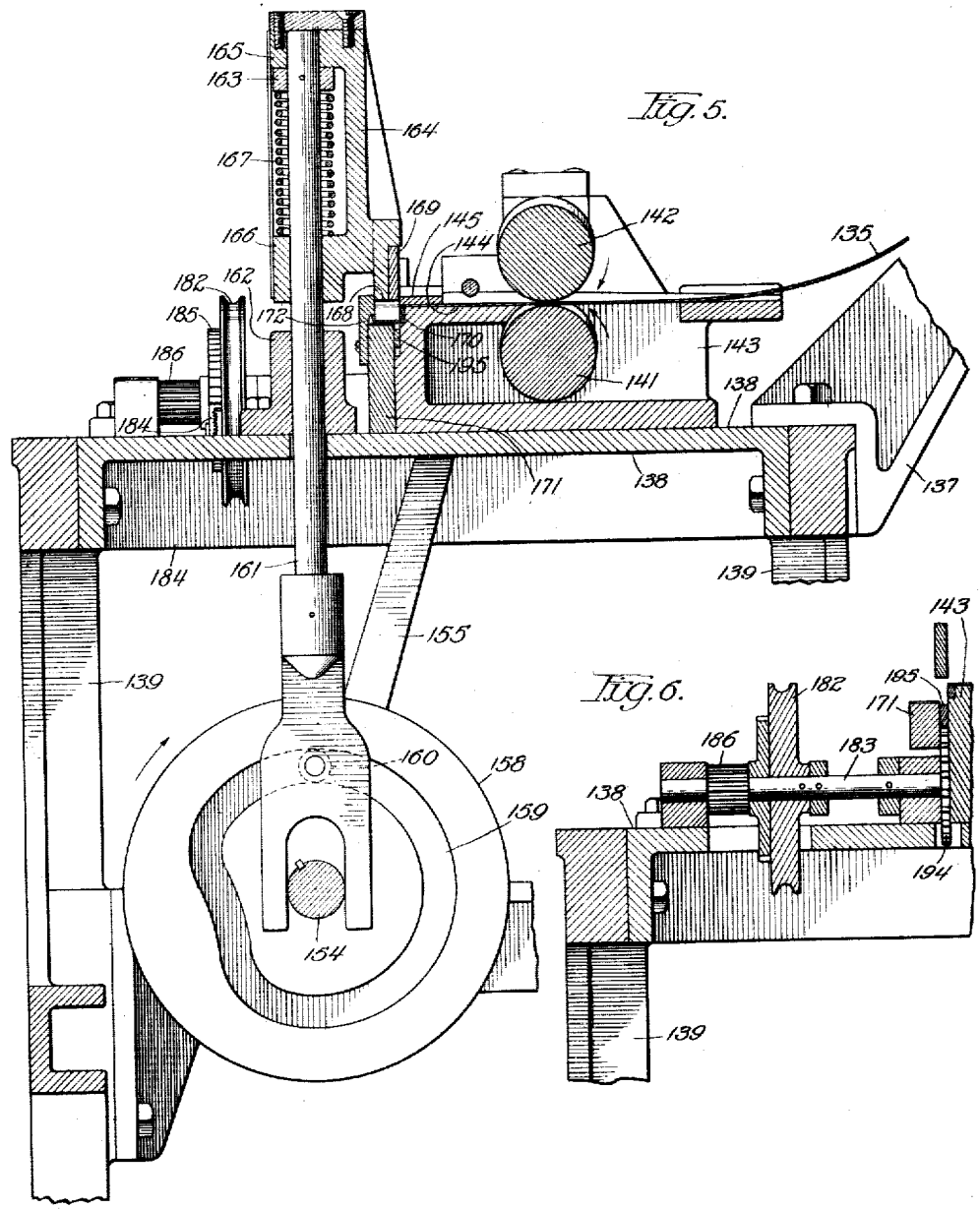

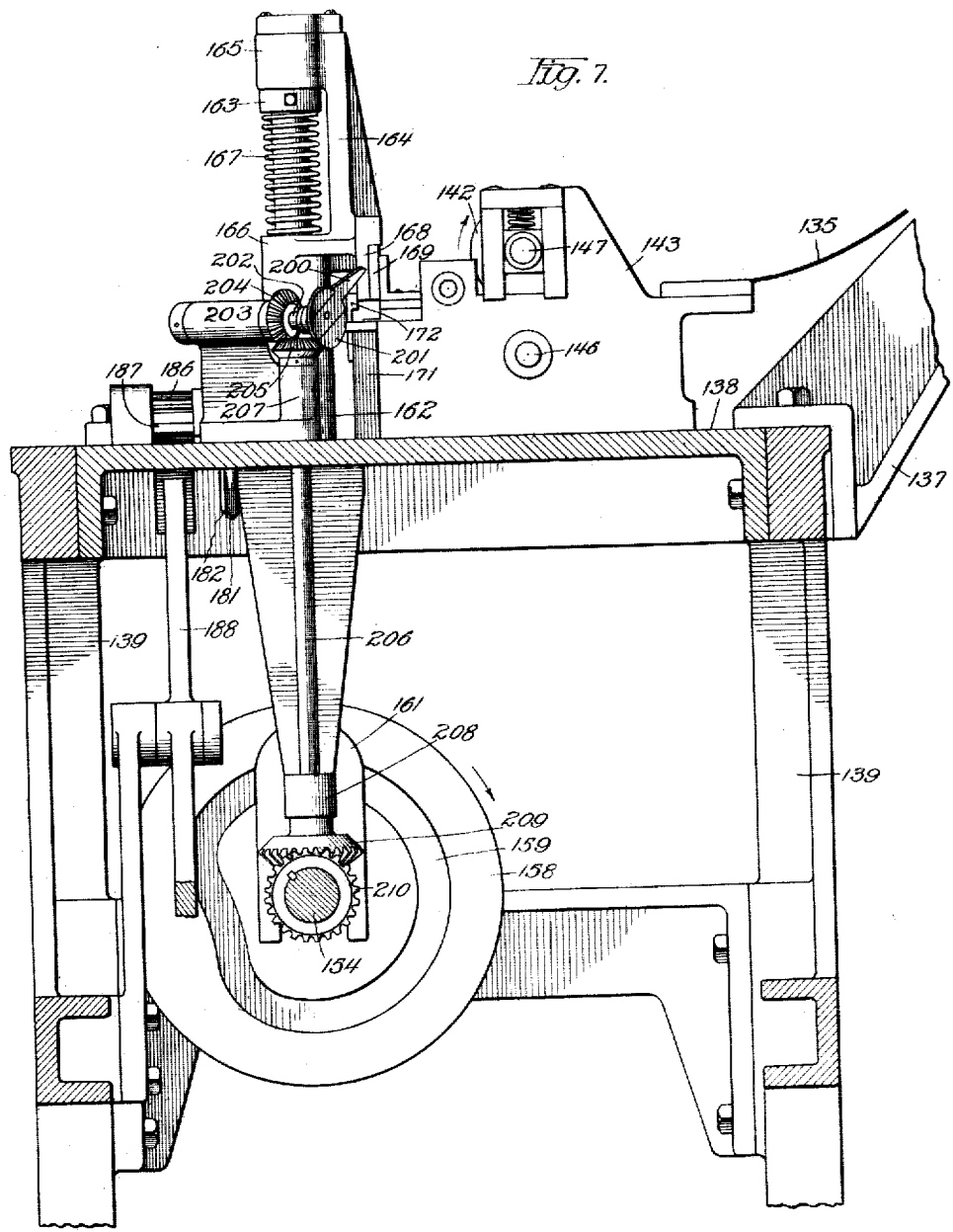

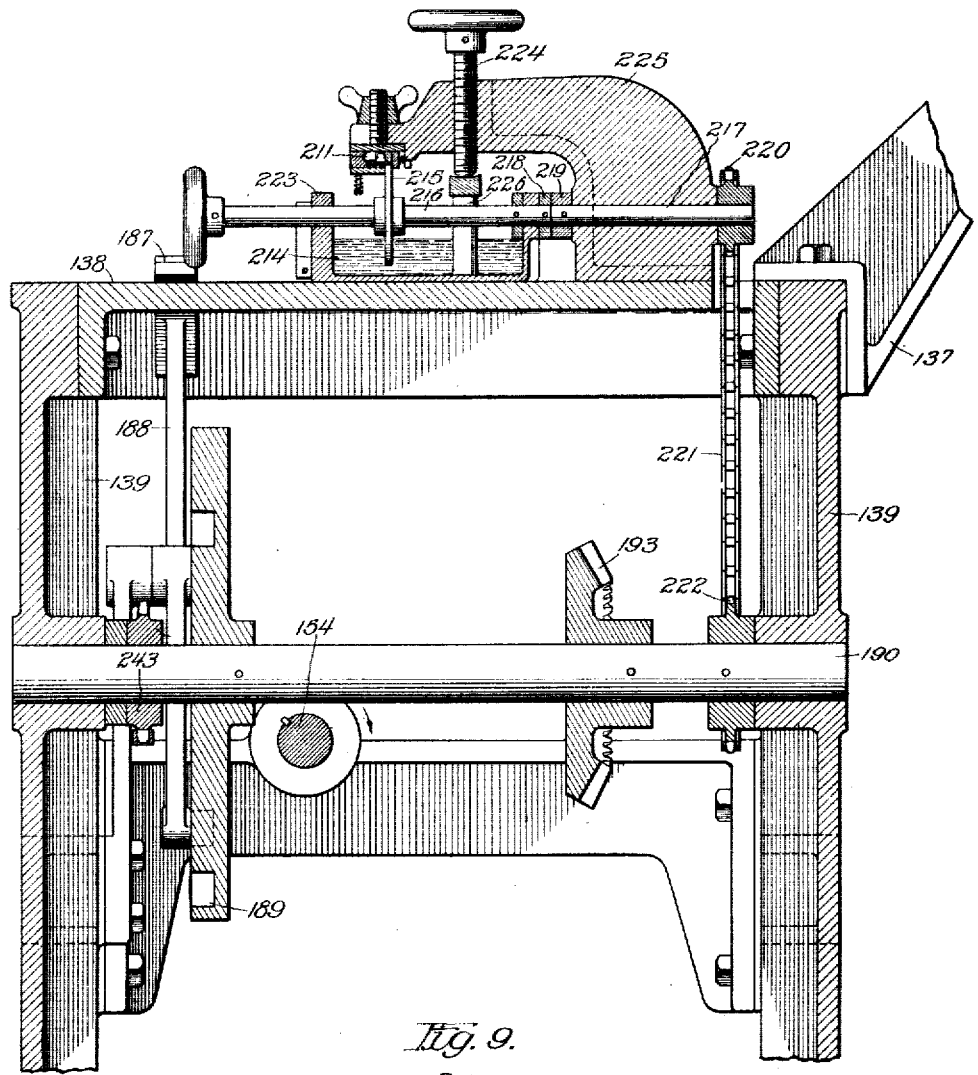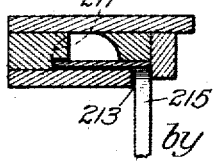

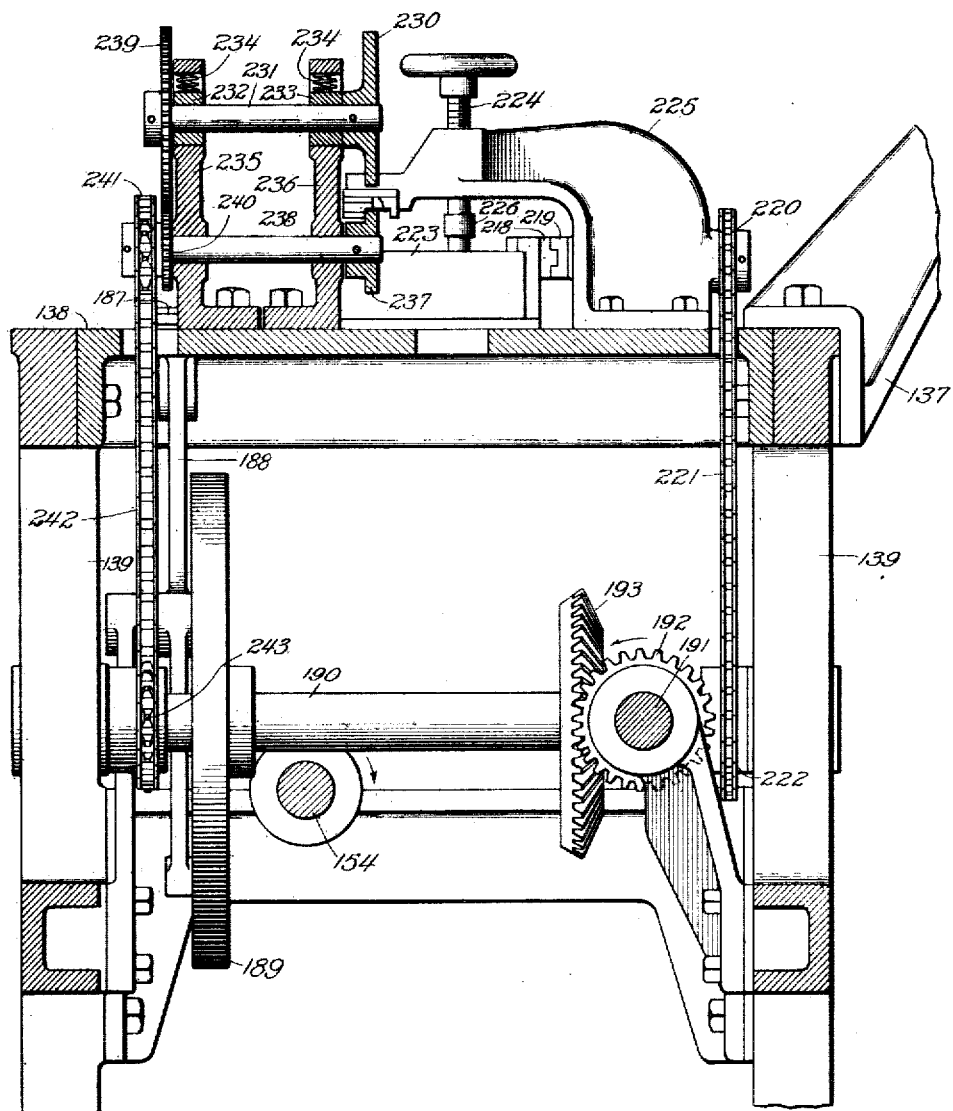

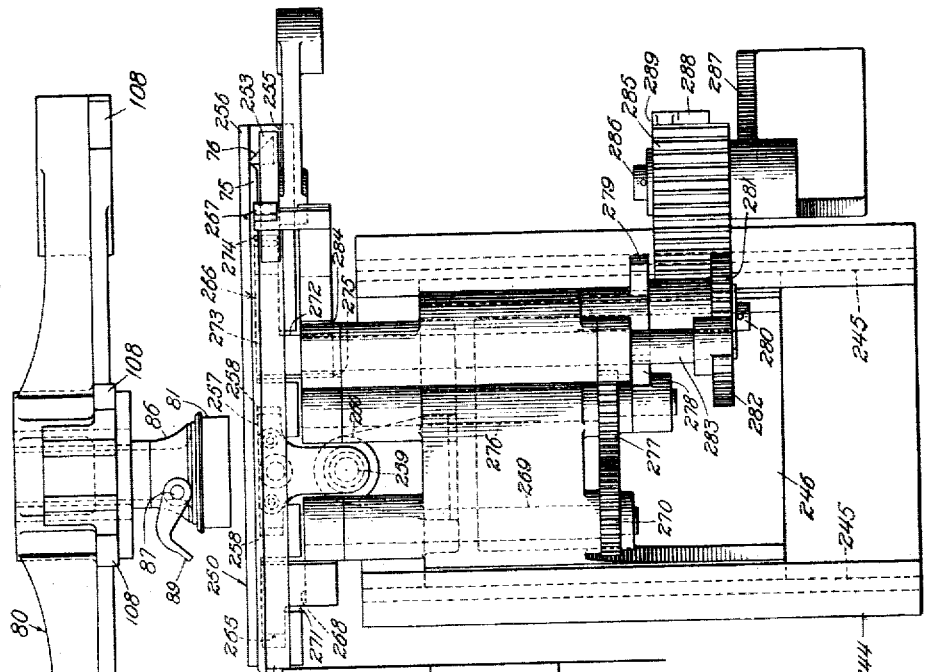

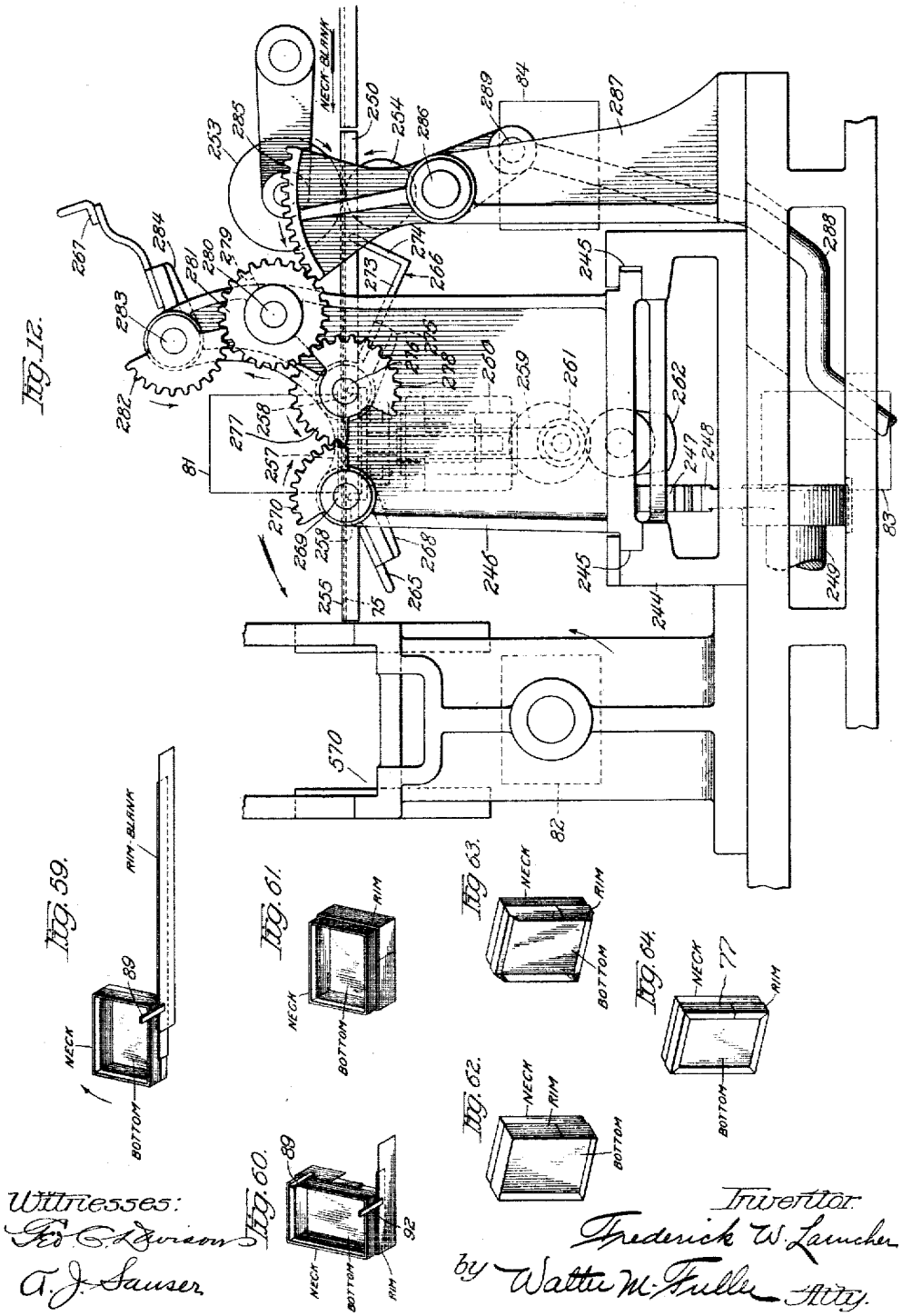

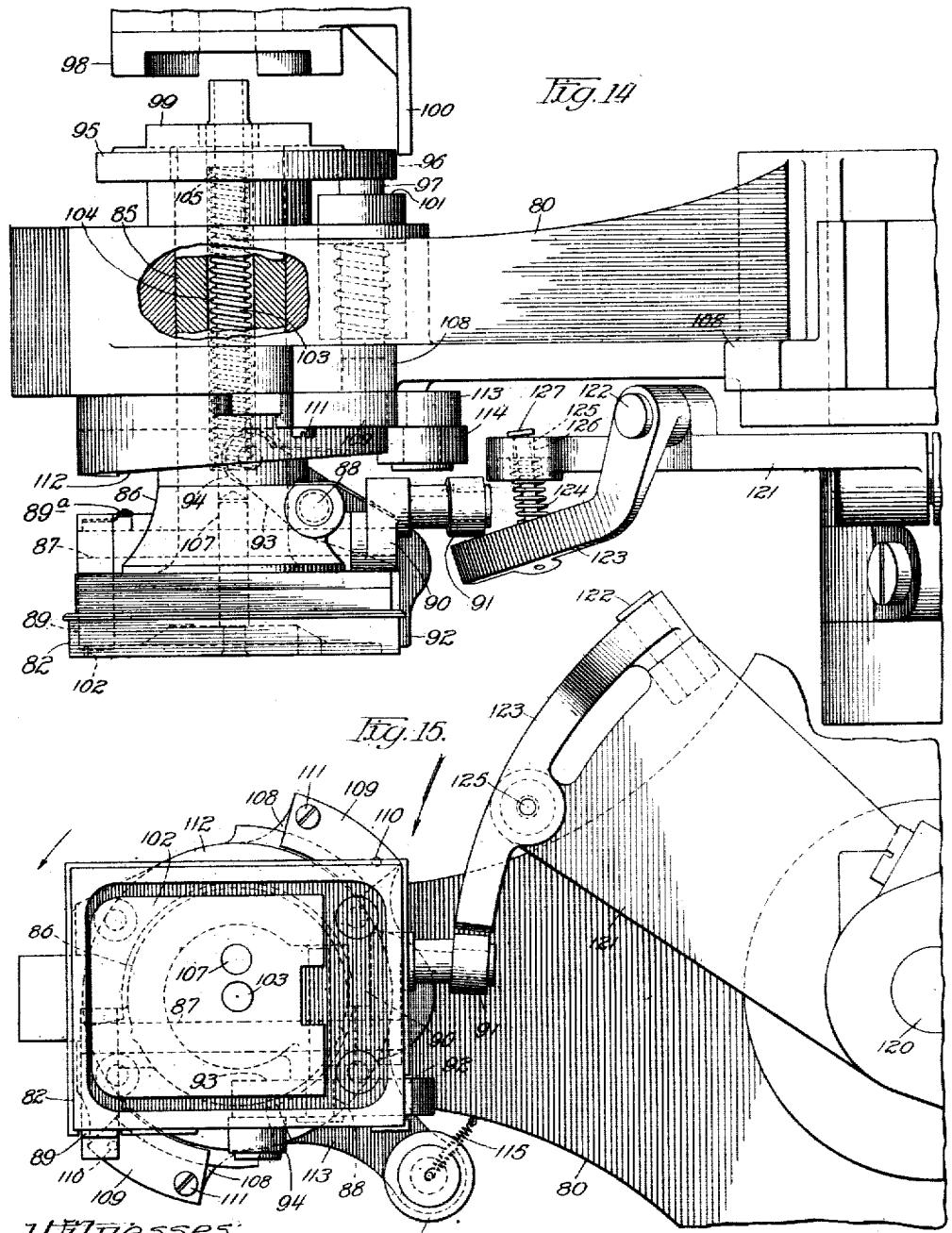

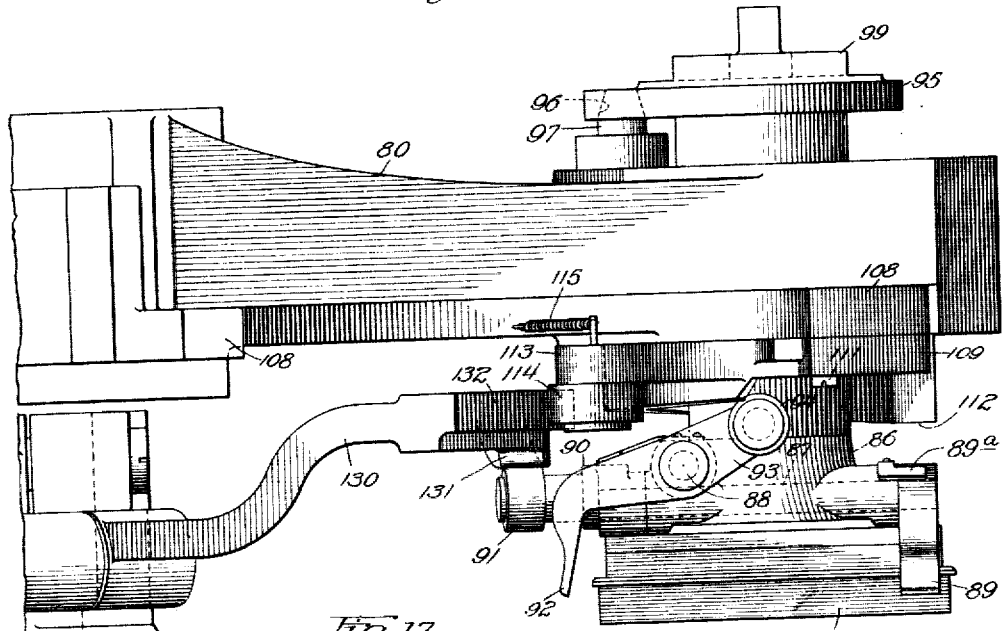
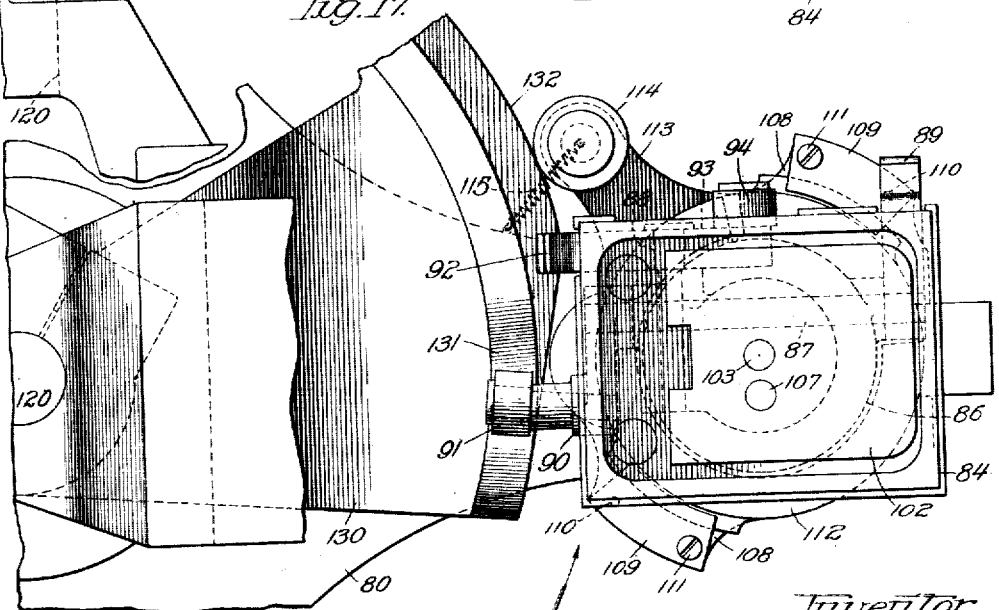

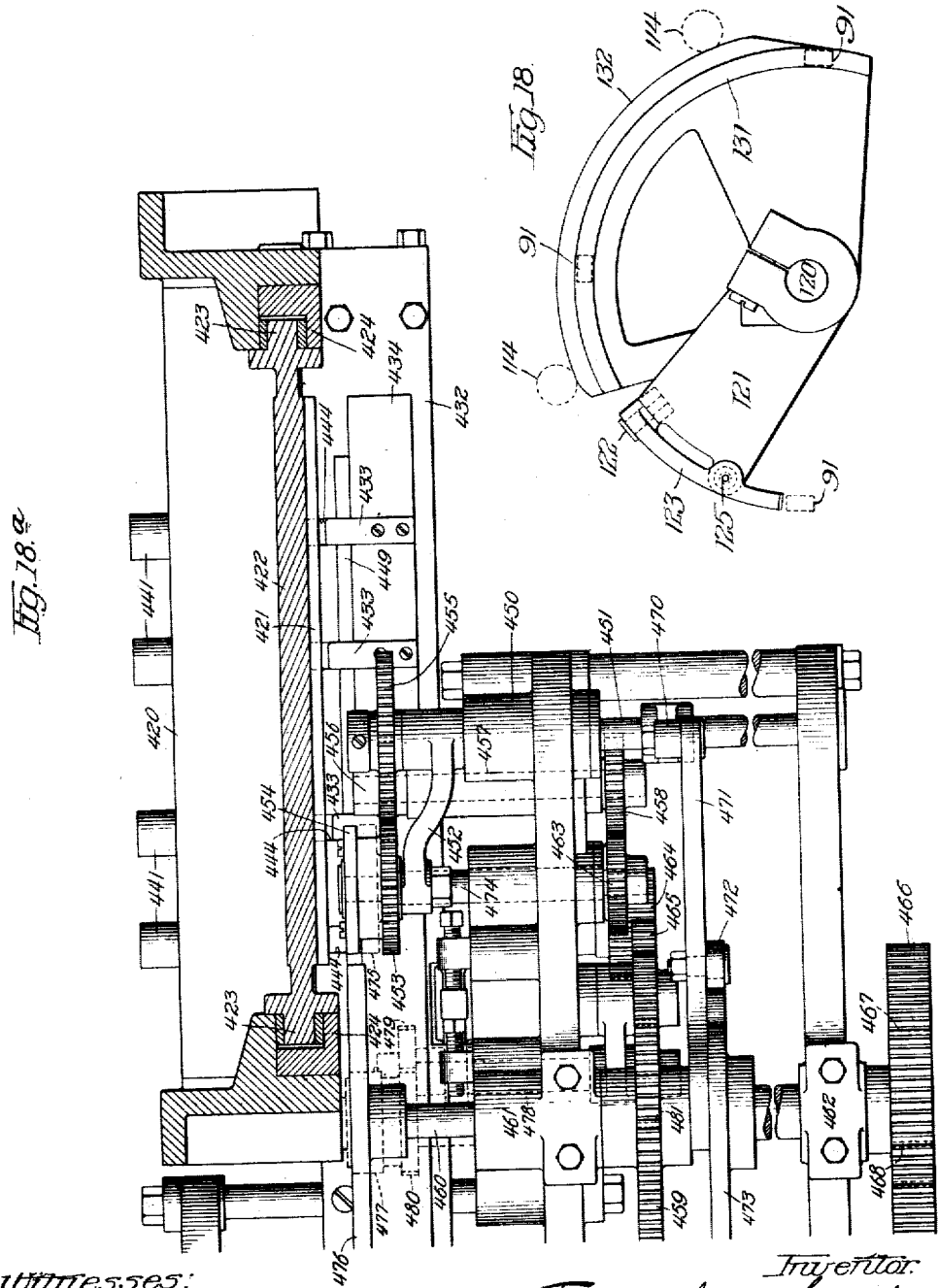

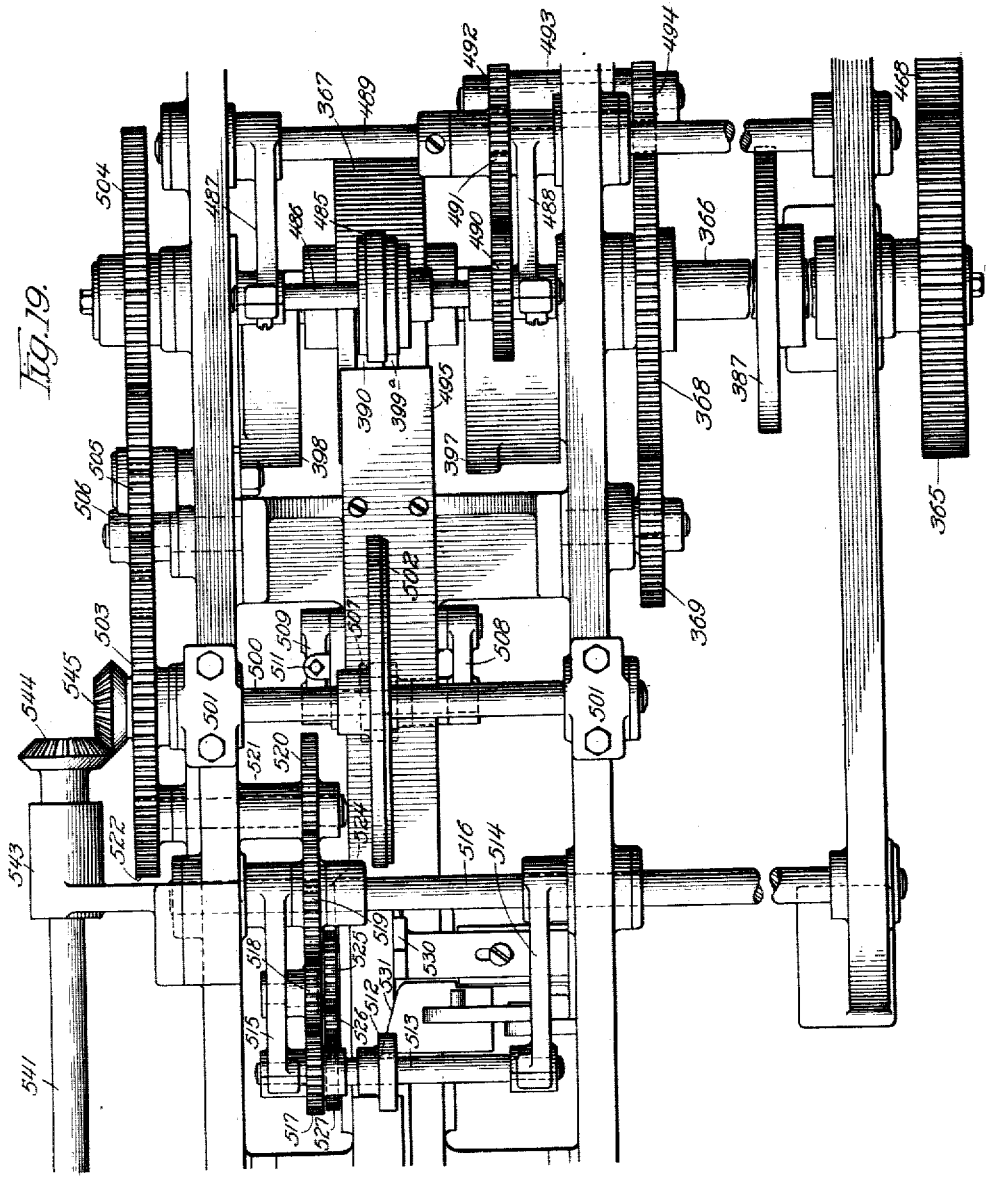

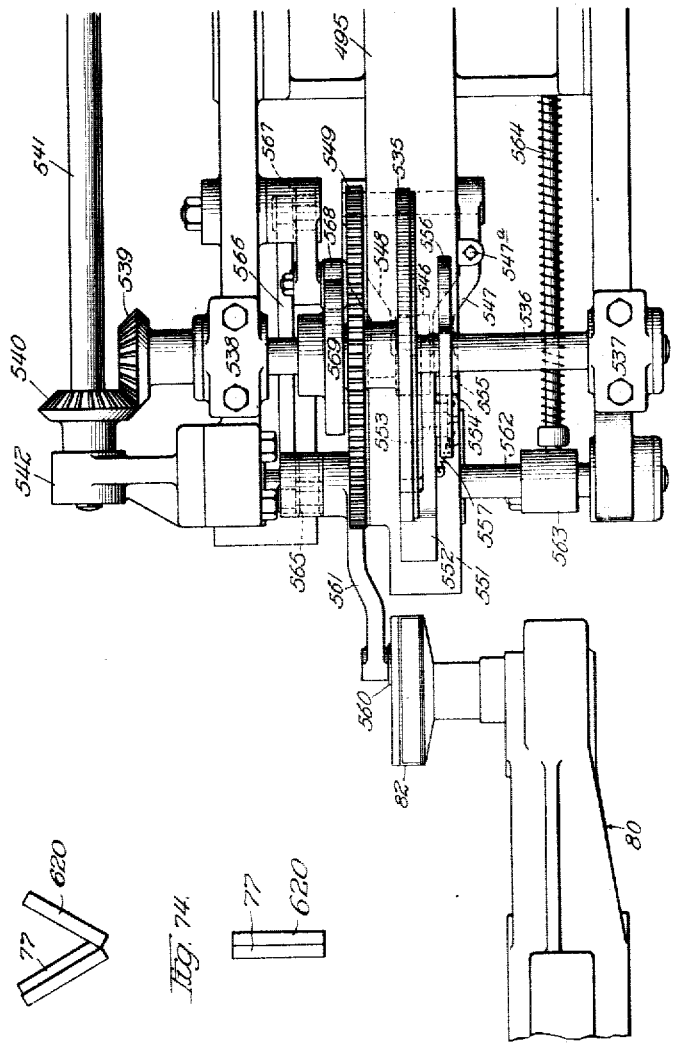

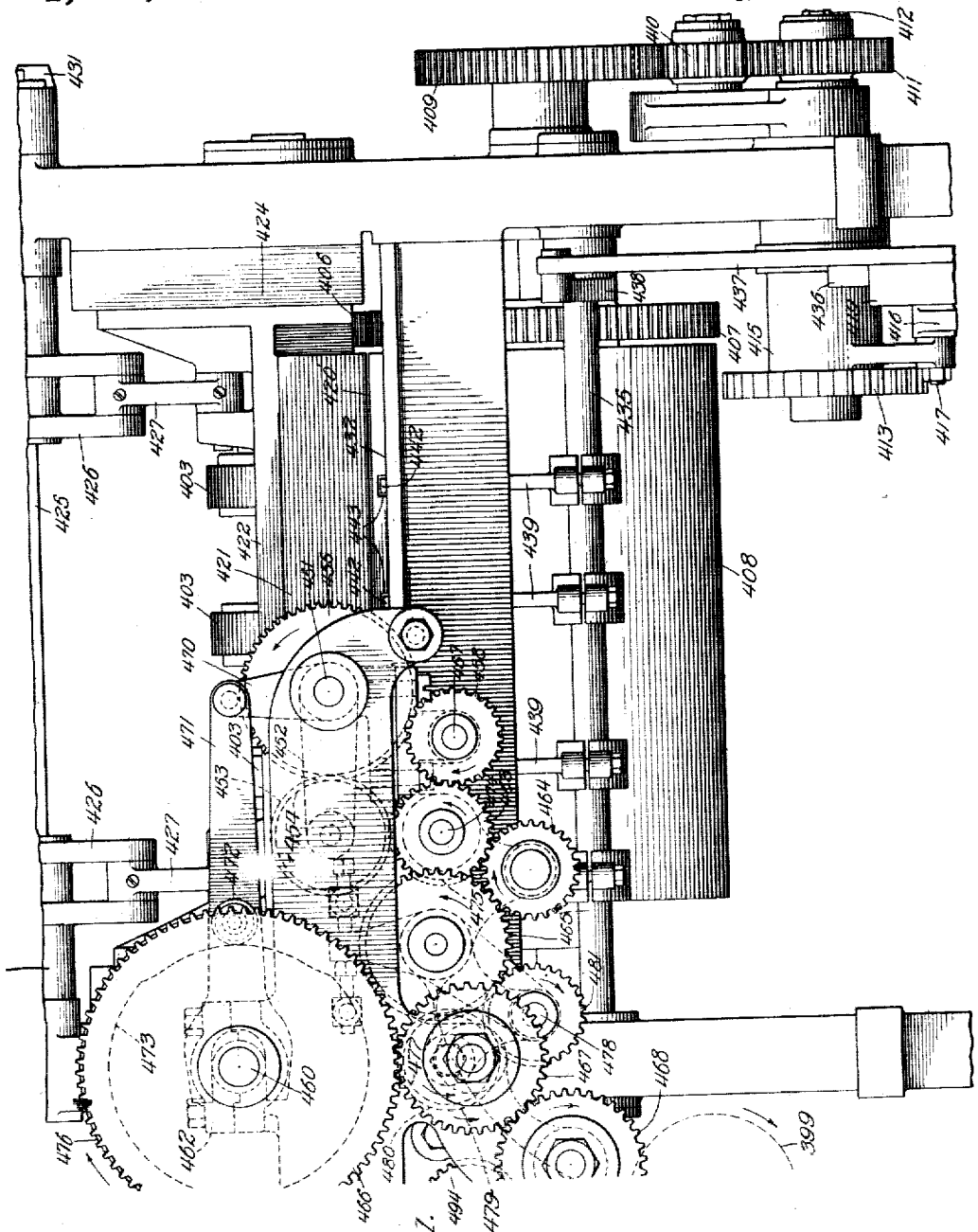

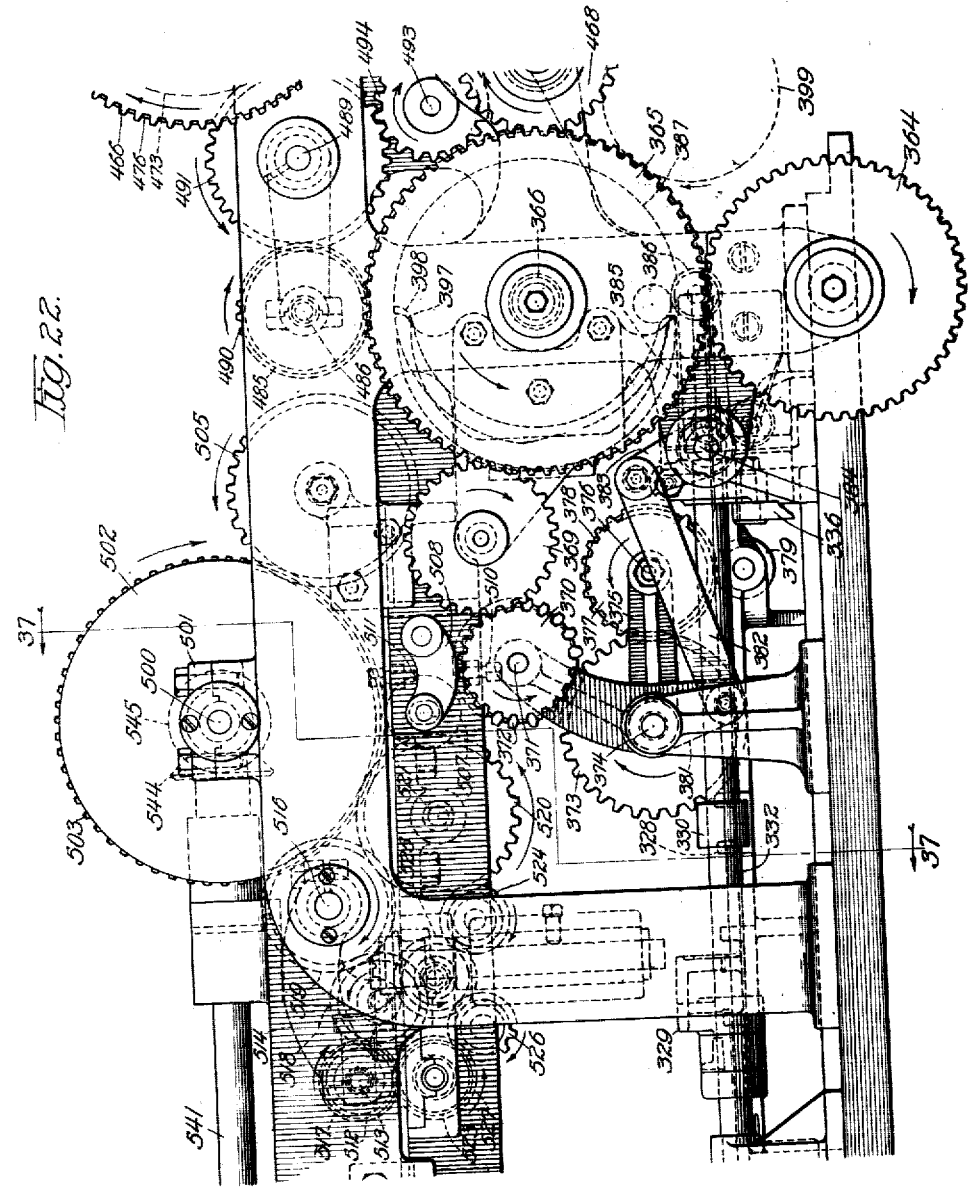

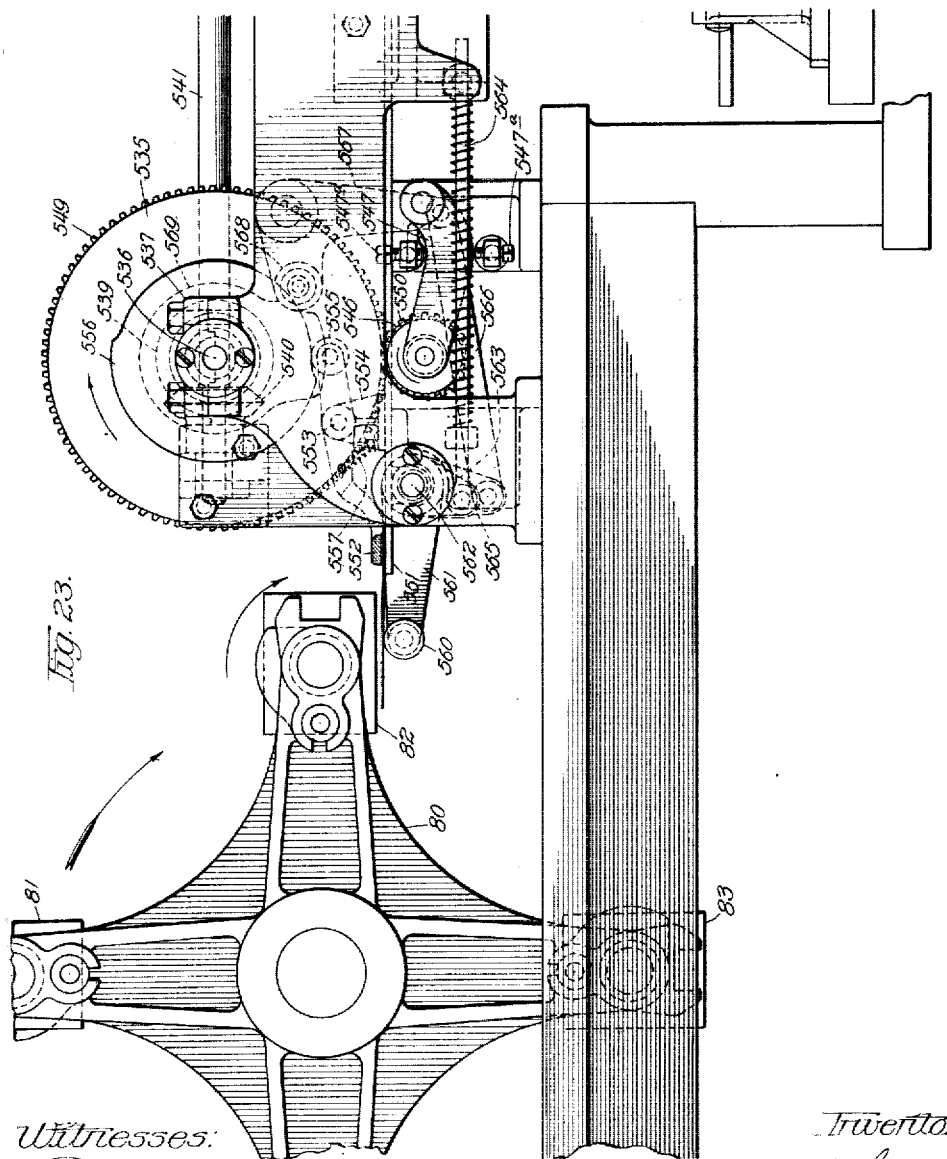

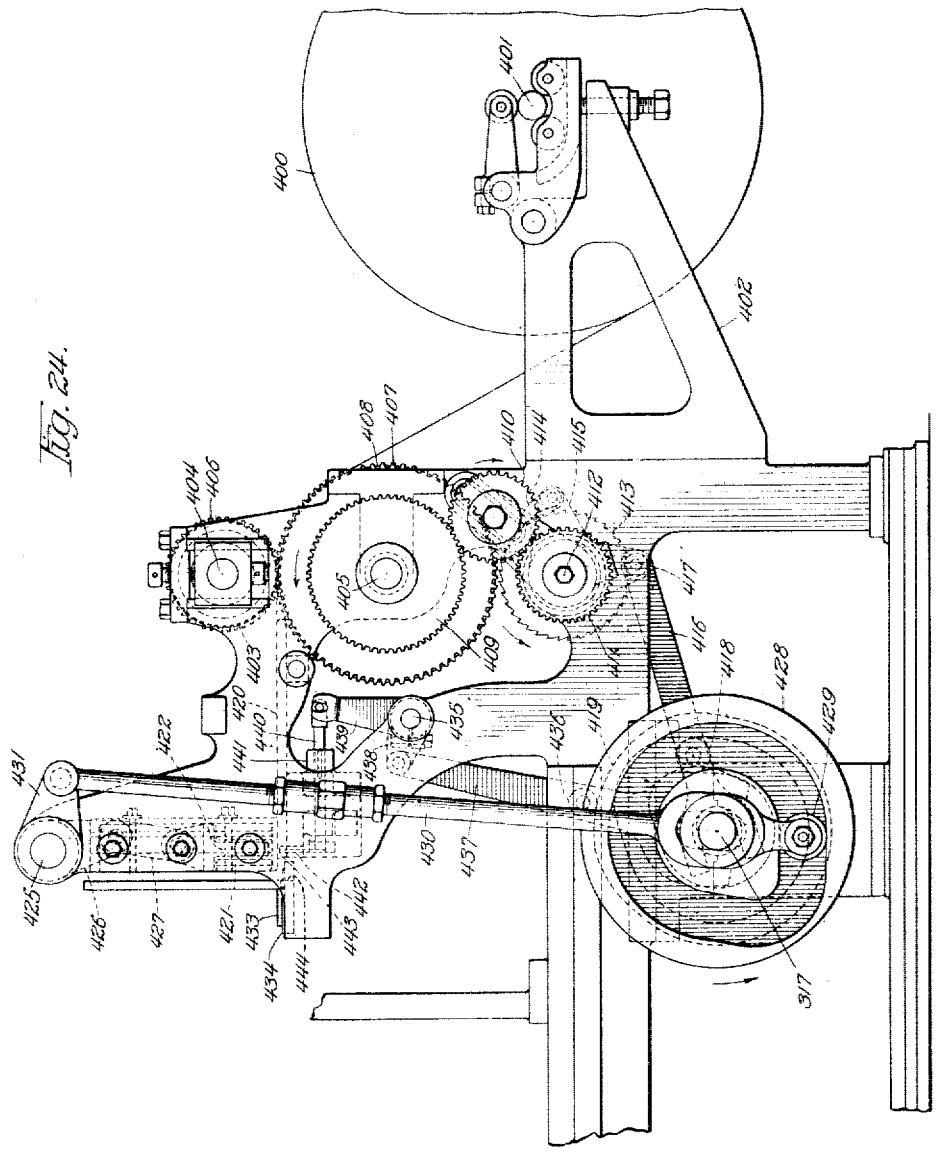

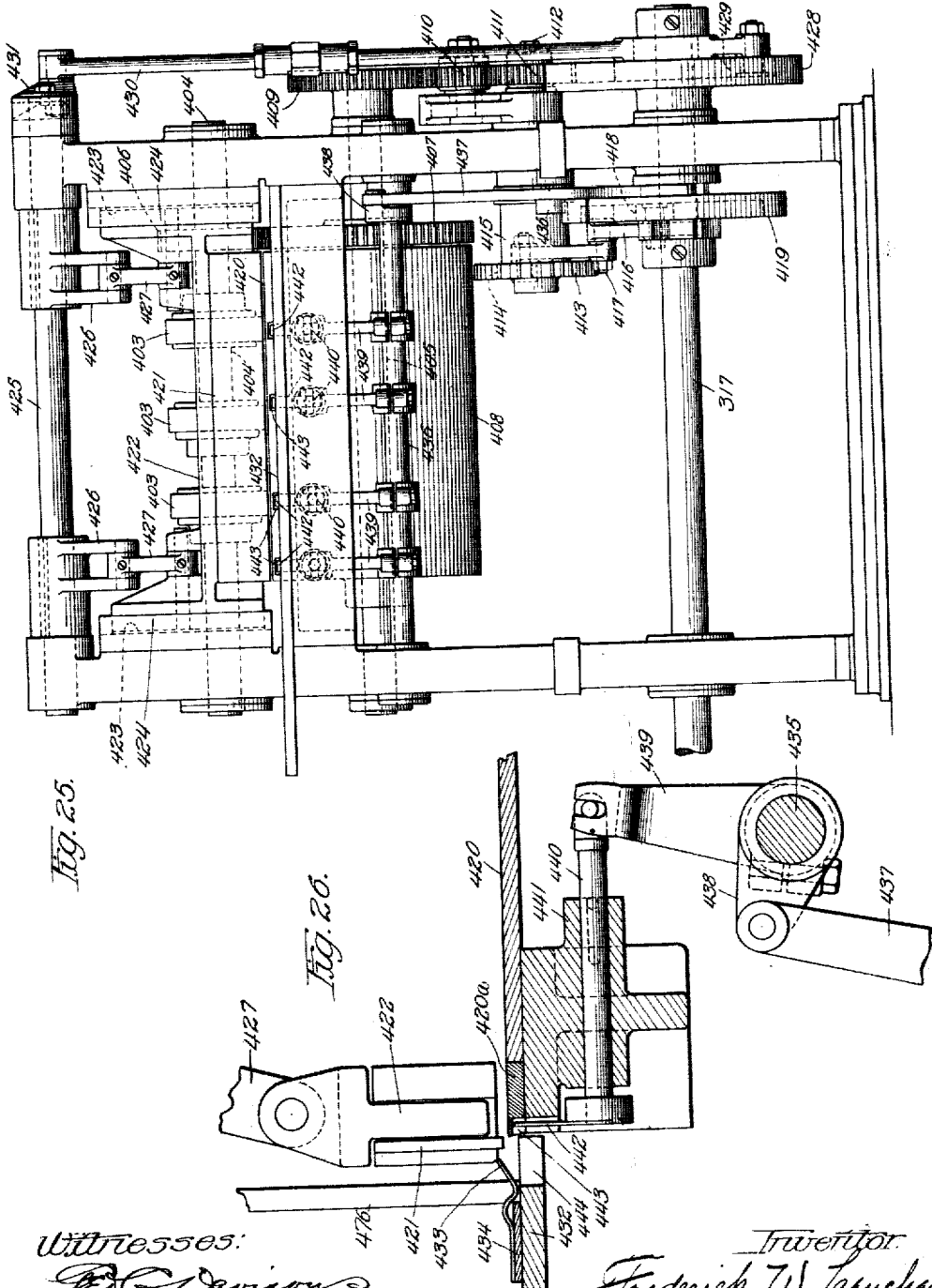

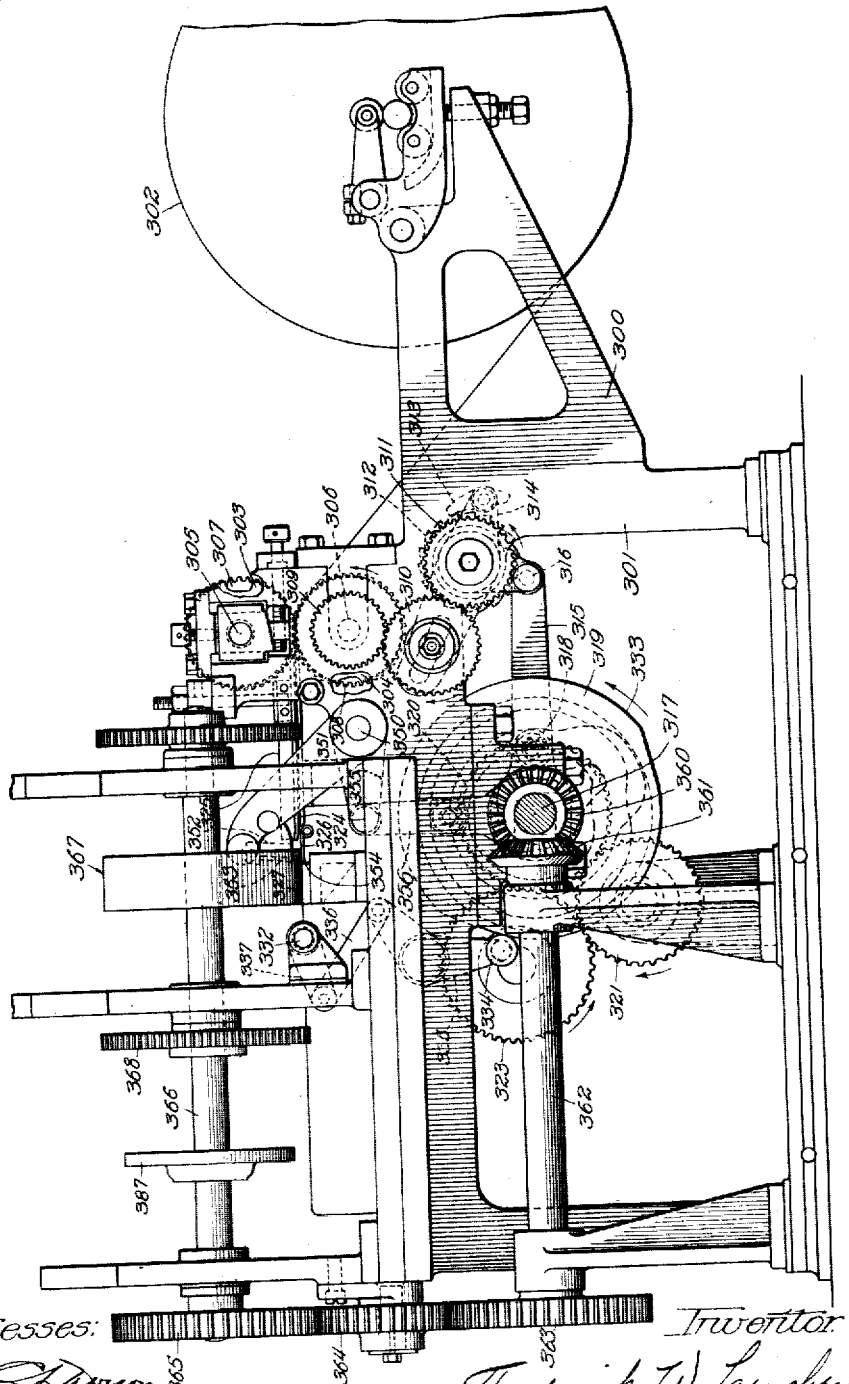

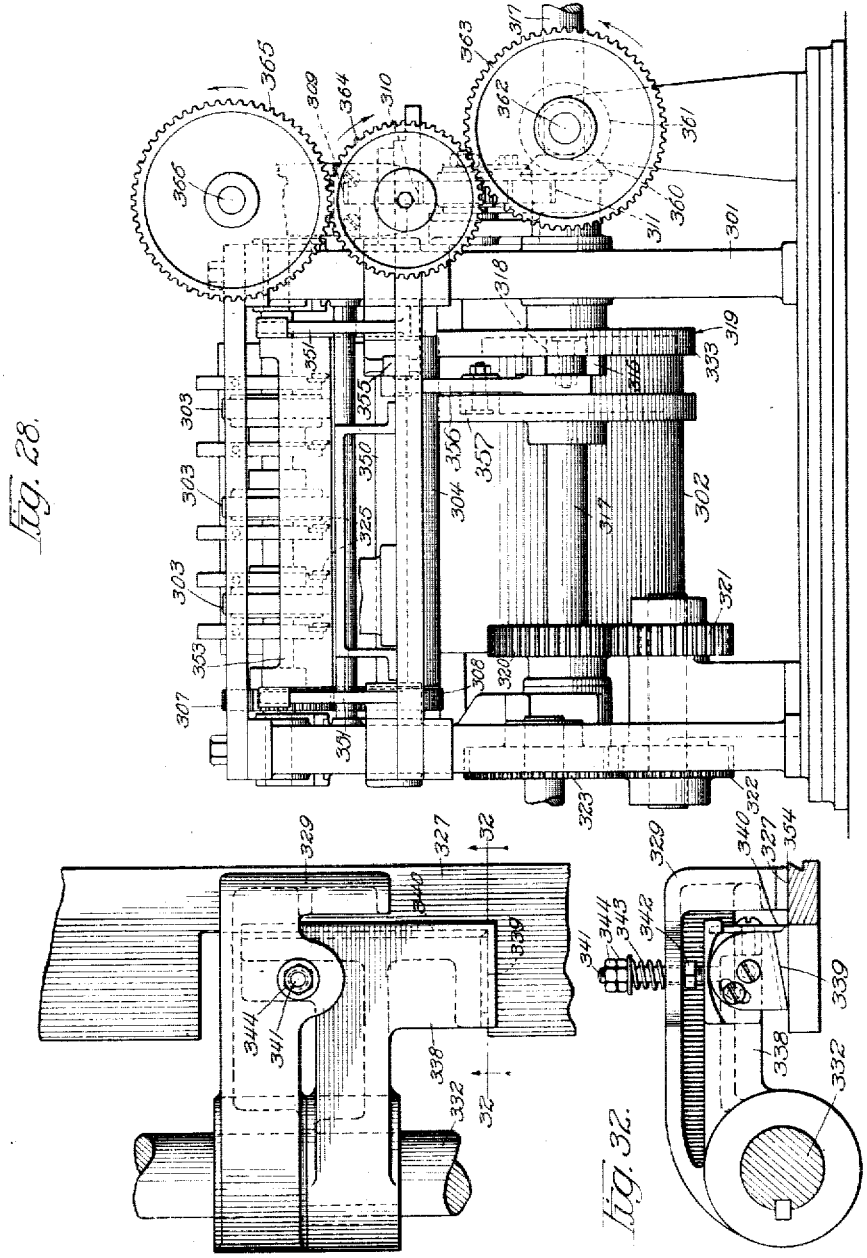

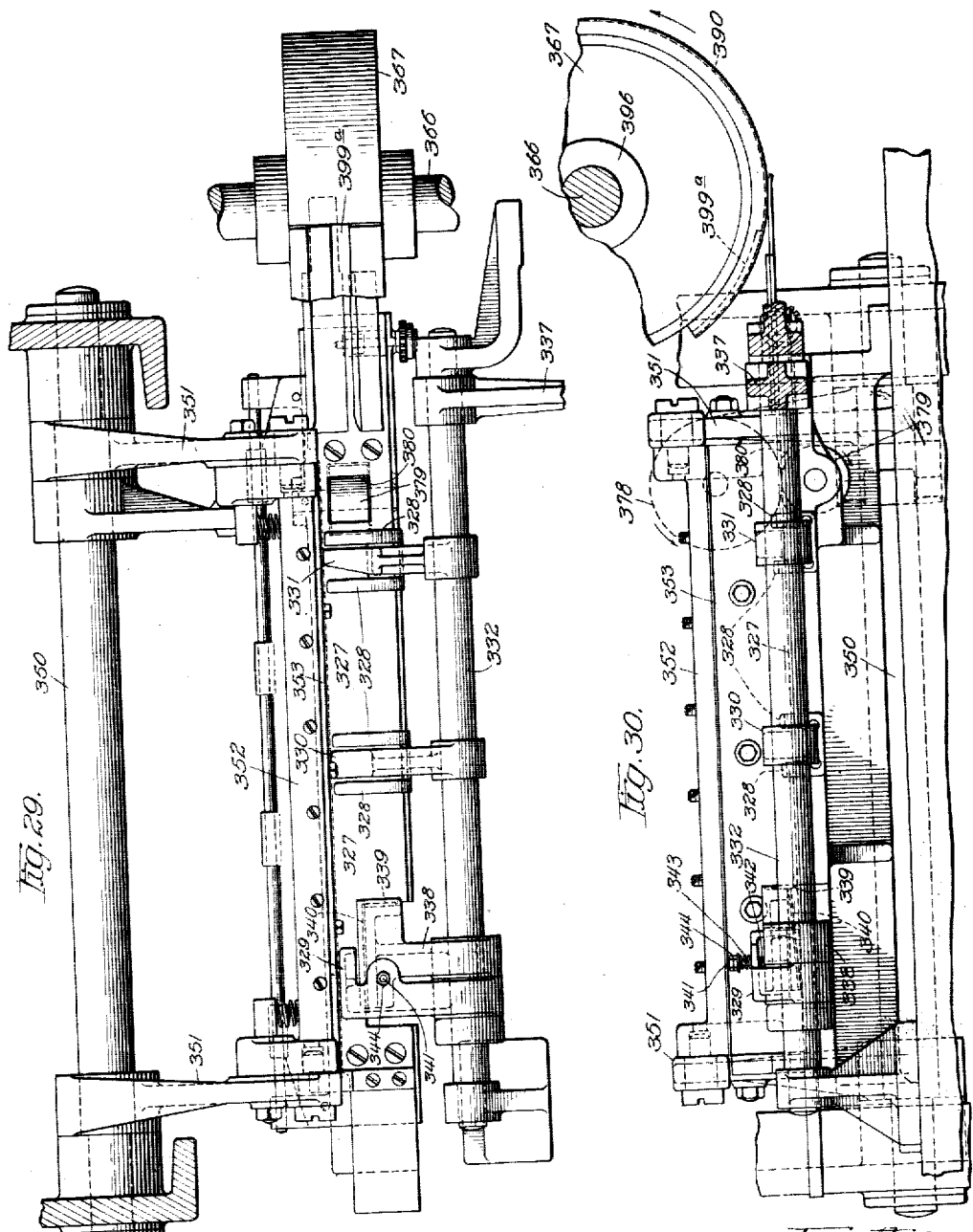

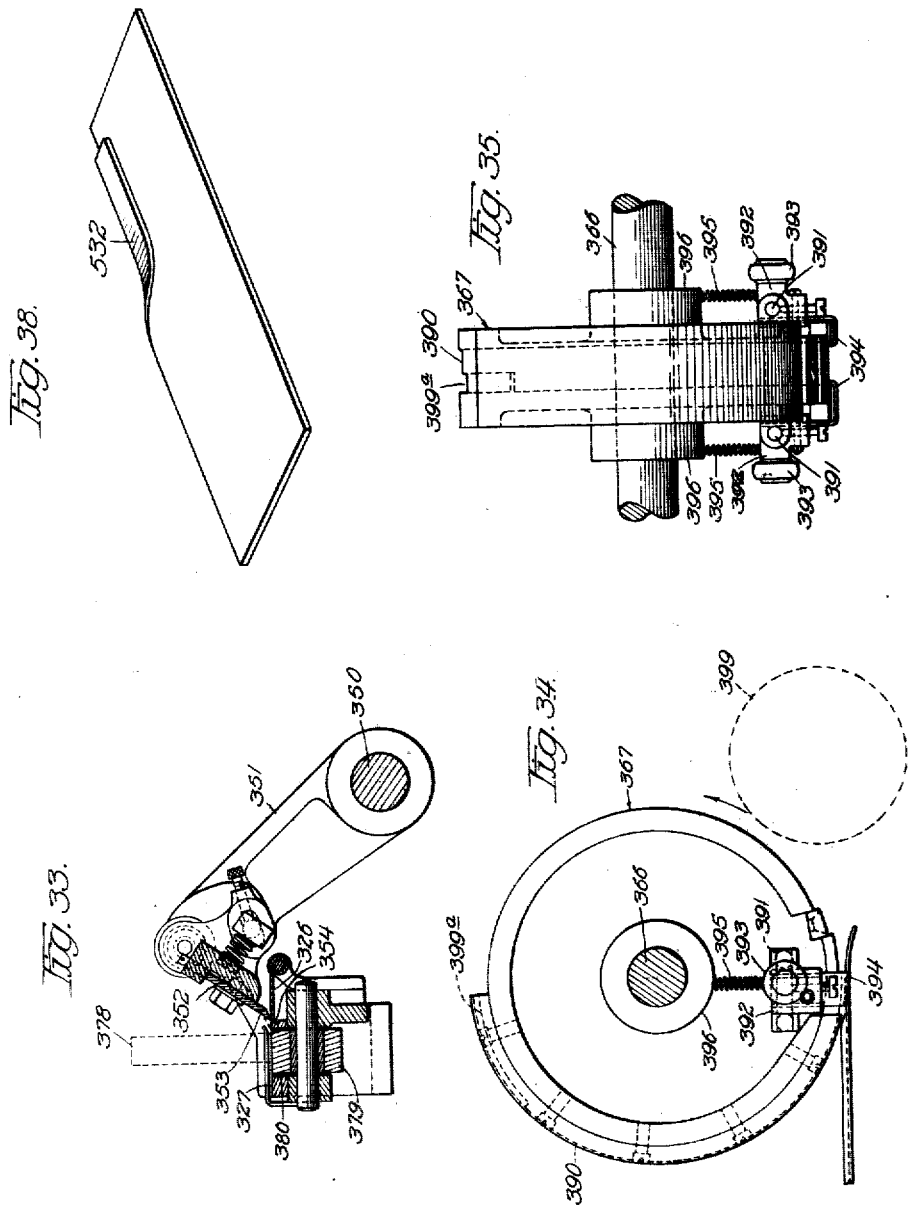

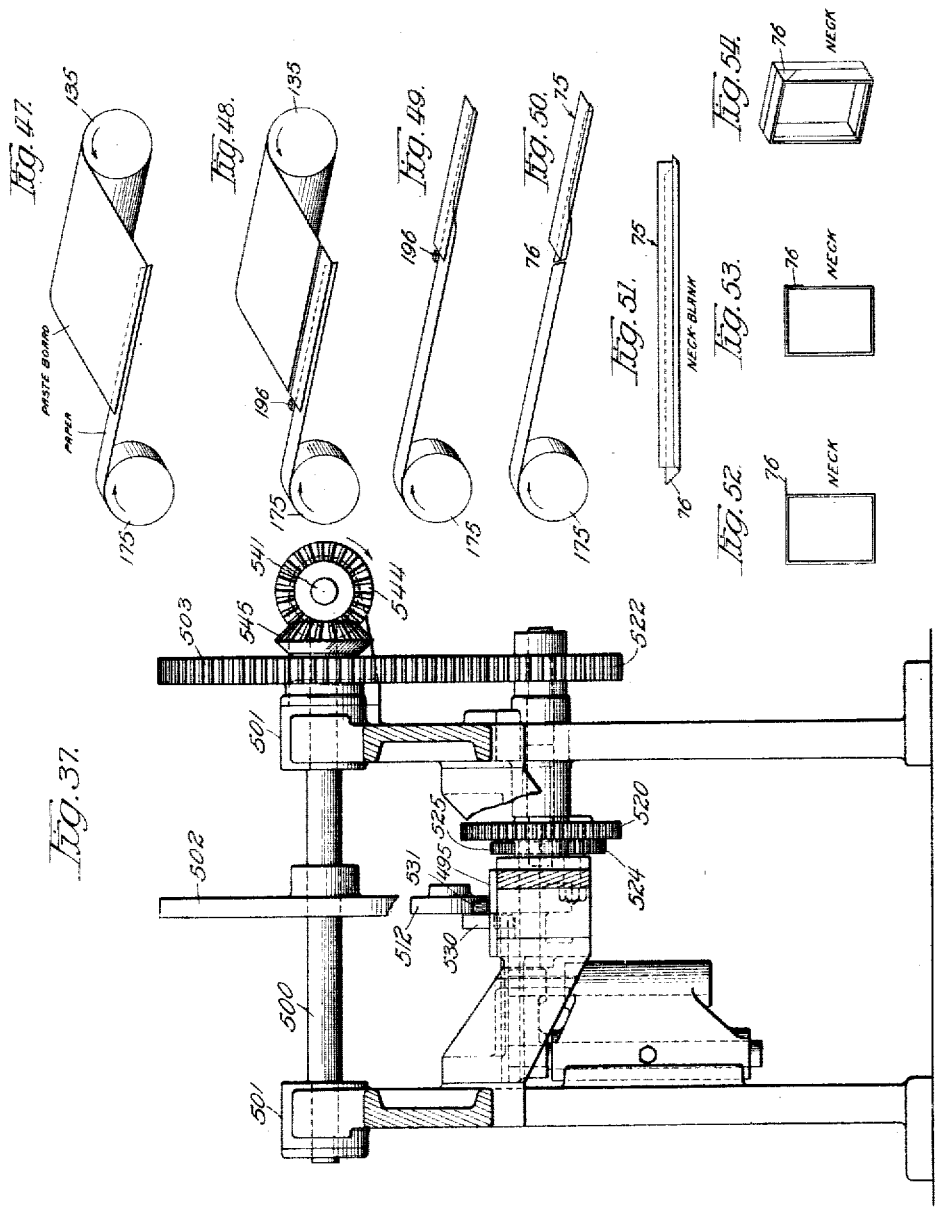

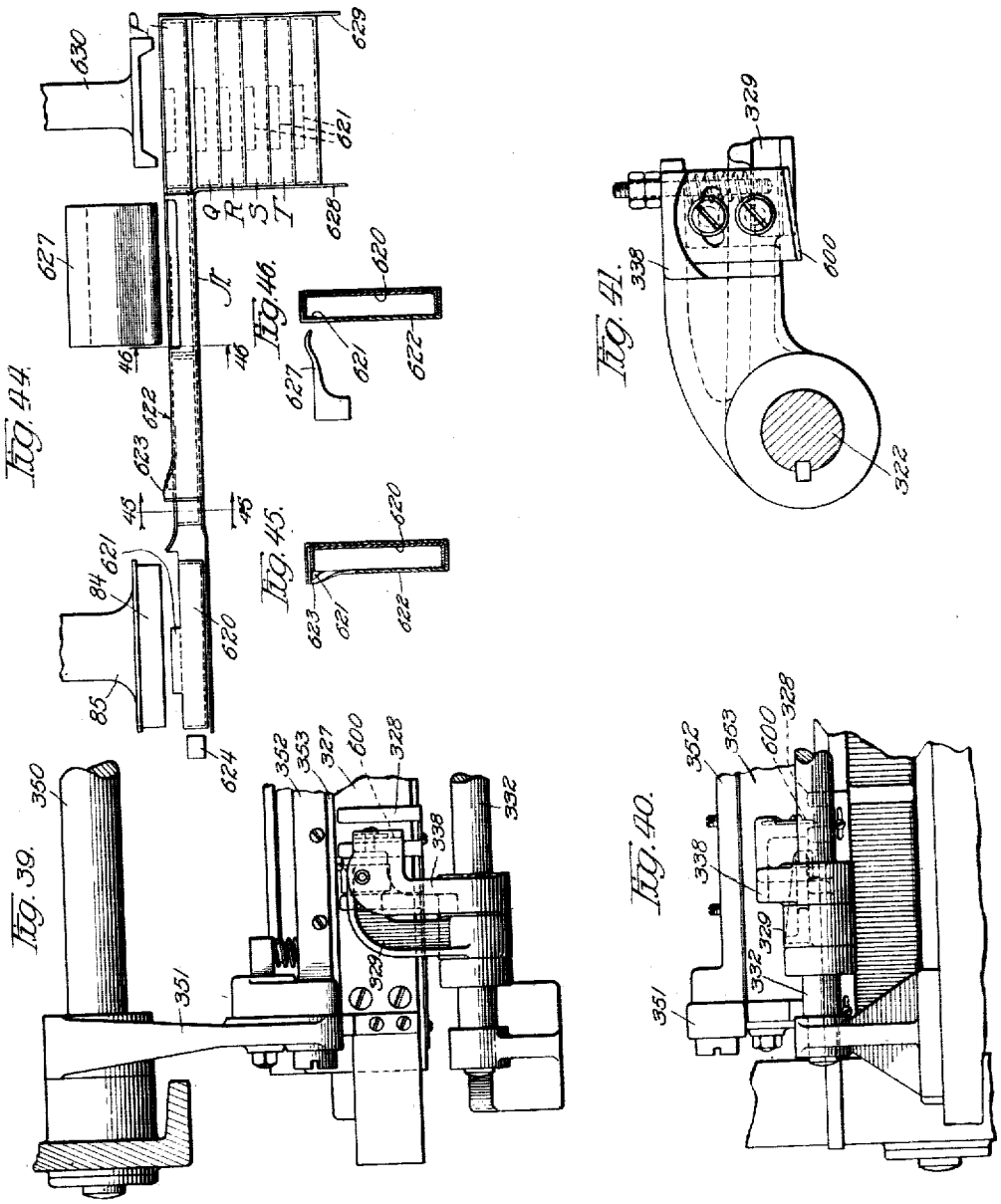

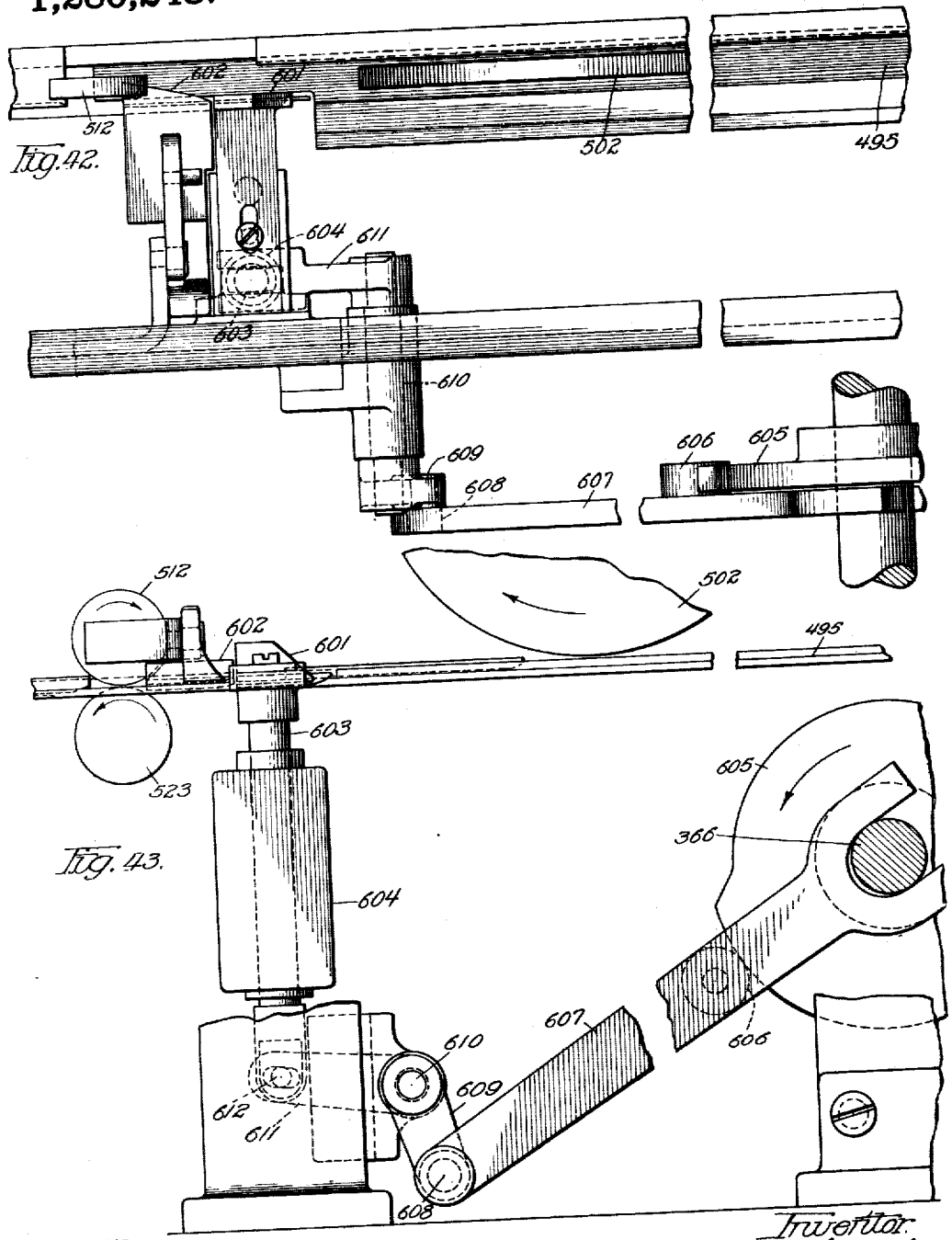

UNITED STATES PATENT OFFICE.

FREDERICK WILLIAM LAENCHER, OF WOODHAVEN, NEW YORK, ASSIGNOR TO W. C. RITCHIE & COMPANY, OF CHICAGO, ILLINOIS, A CORPORATION OF ILLINOIS.

BOX-MAKING MACHINE.

1,280,248.  Specification of Letters Patent.  Patented Oct. 1, 1918.

Application filed April 5, 1916. Serial No. 88,991.

*To all whom it may concern:*

Be it known that I, FREDERICK WILLIAM LAENCHER, a citizen of the United States, residing at Woodhaven, county of Queens, State of New York, have invented certain new and useful Improvements in Box-Making Machines, of which the following is a specification.

One of the leading objects of the present invention is the production of a machine which will automatically manufacture substantially-complete boxes, preferably those of rectangular form, in which the box-body comprises a bottom, a rim, a binder-strip uniting the two, and a collar or neck suitably covered with finish material and positioned in the box-body in the usual manner. The associated box cover comprises a head, a rim, and a binder-strip and in both instances, the binder-strip is desirably folded over the edge of the rim into the box-body or into the cover as the case may be. The complete machine includes not only the means for making these box elements, but also comprises instrumentalities for assembling each box-body with a box-cover, the rim of the latter fitting over the projecting neck of the former, in the usual manner.

The stock for the manufacture of such boxes is preferably supplied in the form of rolls or continuous webs and the finished boxes are complete except for the labeling.

While the entire machine includes means for performing all of the specified functions, there are numerous features of novelty and improvement in the various parts of the invention covering whole appliance, the invention covering these as well as the machine as an entirety.

The invention is susceptible of a variety of embodiments, but in order that those skilled in this art may more readily understand the invention and the advantages accruing from it, a preferred embodiment of the same has been illustrated in the accompanying drawings and described below. Throughout the various views of these drawings like reference characters refer to the same parts.

In this embodiment of the invention, there is an intermittently-rotated carrier equipped with a plurality of forms, (four in the present instance). A paper covered neck is bent around each of these forms in succession from a flat duplex or composite blank composed of a strip of foundation material and a strip of finish-material, such as paper, one margin of which is folded over the foundation or pasteboard blank and adhered to its opposite face.

In the next position of rest of each form, a bottom is applied thereto and a box-body rim is bent around the neck and bottom on the form, such rim being made of a double flat blank composed of a pasteboard-strip and a paper or similar binder-strip.

The neck is bent around the form while the latter is stationary, but the box-body rim is wrapped around the form while the latter revolves on its own axis.

In the next position of the form, the paper binder-strip of the rim is folded over on to and caused to adhere to the box-bottom, and in the last position of each form, the completed box-body is discharged or ejected from this portion of the machine so that it may travel to an assembling part thereof.

The box-cover is constructed similarly to the box-body with the notable exception, of course, that it has no neck or collar and there are a few differences in the details of construction of the two parts.

The assembling portion of the machine brings the box-bodies and covers together individually and provides each body with a cover fitting over its protruding neck, the closed boxes being discharged in any convenient manner ready for labeling.

In the drawings, for clearness of illustration, some parts of the mechanism have been omitted and no attempt has been made to show the precise and exact shape and location of cams and other operating elements, but no difficulty will be encountered in understanding the structural and functional characteristics of this machine, which represents a desirable embodiment of the invention.

In these drawings:

Figure 1 is a diagrammatic plan view of the entire structure;

Fig. 2 is an elevation of the portion of the machine which forms the flat duplex neck blanks.

Fig. 3 is a plan of the structure shown in Fig. 2;

Fig. 4 is an enlarged cross-section on line 4—4 of Fig. 3;

Fig. 5 is an enlarged cross-section on line 5—5 of Fig. 3;

Fig. 6 is a fragmentary cross-section on line 6—6 of Fig. 3;

Fig. 7 is an enlarged cross-section on line 7—7 of Fig. 3;

Fig. 8 is a similar cross-section on line 8—8 of Fig. 3;

Fig. 9 is an enlarged fragmentary section illustrating the paper folder and the means for applying adhesive to the projecting portion of the pasteboard;

Fig. 10 is an enlarged cross-section on line 10—10 of Fig. 3;

Fig. 11 is a plan view of the mechanism for folding the neck blanks around the forms;

Fig. 12 is an elevation of the structure shown in Fig. 11;

Fig. 13 is an elevation of the structure as viewed from the right in Fig. 11;

Fig. 14 is a fragmentary plan of the form carrier and illustrates one of the forms and its associated elements;

Fig. 15 is an elevation of the structure shown in Fig. 14;

Fig. 16 is a view similar to Fig. 14 but illustrates the ejecting form position;

Fig. 17 is an elevation of the device indicated in Fig. 16;

Figure 36:
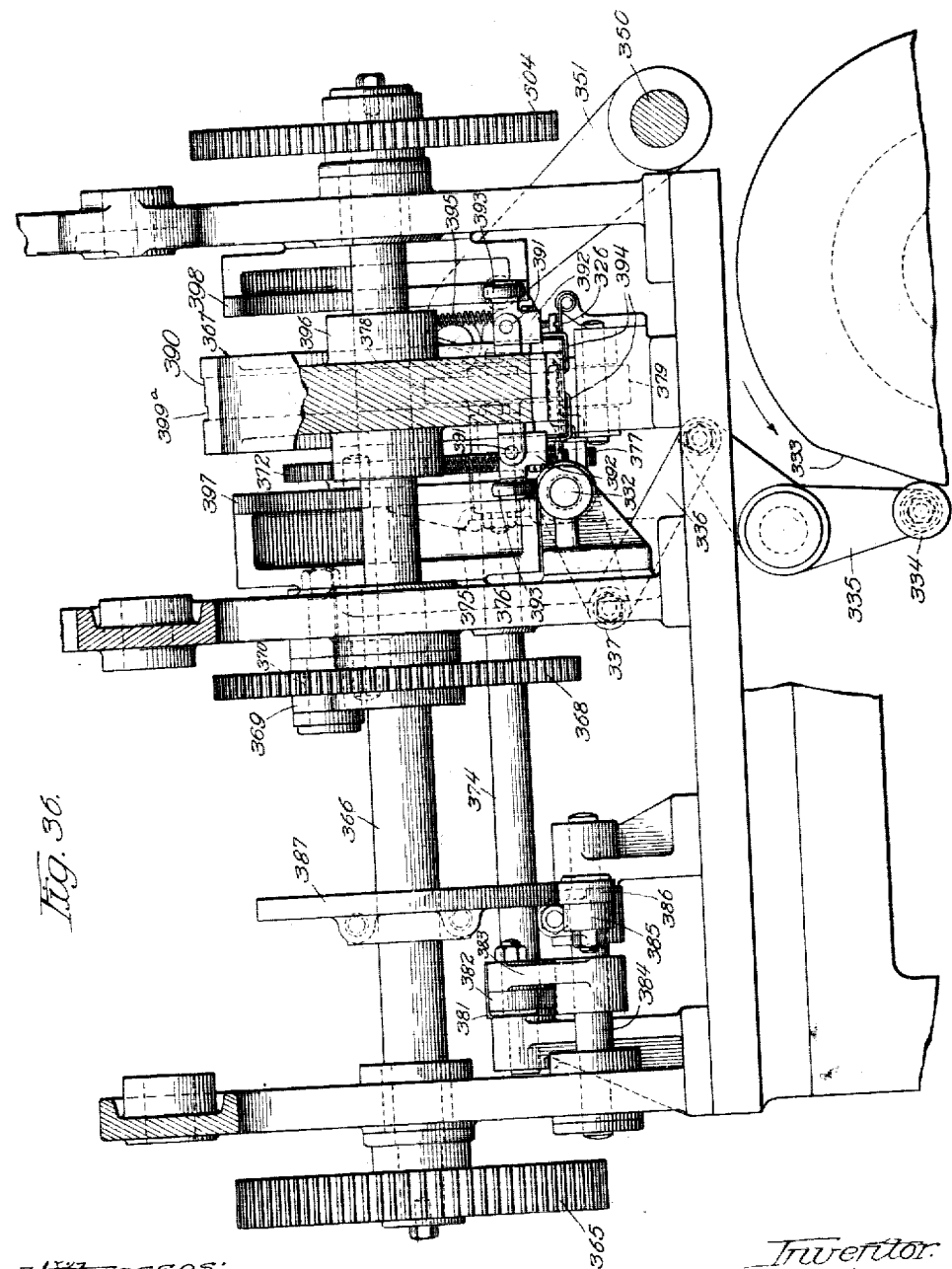

Figs. 14, and 16 and Figs. 15 and 17 may be joined together to give a more complete idea of the carrier and its plurality of forms of which only, two, however, are shown;

Fig. 18 shows two of the cams controlling the operation of the gripper fingers coacting with the forms;

Figs. 18ª and 19 and 20 unitedly illustrate a plan of that portion of the mechanism which produces the flat composite rim-blanks for the box-bodies, certain portions of the mechanism being shown in section and other parts omitted for clearness of illustration. Fig. 18 should be placed to the right of Fig. 19 and Fig. 20 to the left of Fig. 19 to secure the complete plan view.

Fig. 21 is an elevation of the structure shown in Fig. 18;

Fig. 22 is a similar view of the construction shown in Fig. 19;

Fig. 23 is an elevation of that part of the mechanism illustrated in Fig. 20.

To secure a complete elevation, Fig. 21 should be placed to the right of Fig. 22 and Fig. 23 to the left of Fig. 22.

Fig. 24 is a partial elevation of the right-hand end of the structure of Fig. 21, but includes other elements of construction;

Fig. 25 is an elevation of the appliance of Fig. 24 as viewed from the left;

Fig. 26 is a detail section of the means for positioning the severed pasteboard-blanks for feeding;

Fig. 27 is an elevation of that portion of the machine operating upon the binder or cover paper for the box-body rims;

Fig. 28 is an elevation of the construction of Fig. 27, as viewed from the left;

Fig. 29 is a plan section of the paper-severing mechanism;

Fig. 30 is an elevation of the same construction;

Fig. 31 is an enlarged detail plan of the cutting mechanism and one of the holding fingers illustrated in Figs. 29 and 30;

Fig. 32 is a vertical section on line 32—32 of Fig. 31;

Fig. 33 is a section illustrating the cutting mechanism for severing the paper-blank from the paper-web;

Fig. 34 is a side elevation of the segmental paper-strip feed-cylinder and its associated gripping mechanism;

Fig. 35 is an elevation of the construction of Fig. 34 as viewed from the right;

Fig. 36 is a partial section and elevation illustrating besides other parts, the paper-strip feed-cylinder and its grippers and other associated cams, or, stated differently, it is a vertical cross-section taken on lines substantially at the right-hand extremity of Fig. 22, with various parts omitted;

Fig. 37 is a vertical cross-section on approximately line 37—37 of Fig. 22, but with various of the elements omitted;

Fig. 38 is a perspective view of a modified type of paper folder;

Fig. 39 is a fragmentary plan view of a modified paper-strip cutting-appliance employed in that portion of the machine which produces the duplex-rim for the box-cover;

Fig. 40 is an elevation of the construction illustrated in Fig. 39;

Fig. 41 is an end elevation of the device shown in Fig. 40;

Fig. 42 is a plan of a portion of the mechanism which produces the composite-blank for the rim of the cover and illustrates more especially the means for folding a portion of the protruding part of the paper over the pasteboard-blank;

Fig. 43 is an elevation of the structure shown in Fig. 42;

Fig. 44 illustrates the manner of folding the protruding paper tab or ear over the edge of the cover-rim and against its inner face;

Fig. 45 is a section on line 45—45 of Fig. 44;

Fig. 46 is a section on line 46—46 of Fig. 44;

Figs. 47 to 54 illustrate diagrammatically the production of the box-body neck;

Figs. 55 to 64 inclusive show in a similar way the production of the box-body around the neck;

Figs. 65 to 72 inclusive indicate the manner of producing the box-cover, and

Figs. 73 and 74 show the assembling of the box elements.

In the diagrammatic plan view of Fig. 1, it will be observed that the machine comprises six principal parts or sections, as follows:—a main form appliance characterized —"A", equipped with a plurality of forms on which the necked box-bodies are constructed; a device designated —"B", designed to produce the flat duplex or paper-covered pasteboard blanks from which the necks or collars are made; a mechanism denominated —"C" which makes the body rim blanks covered with a binder or finish material; a machine "D" which makes rim blanks for the box-covers; a part —"E", in which the box-covers are produced, and an appliance —"F", which assembles the box-bodies and covers, with the rims of the latter fitted over the projecting necks of the former.

All of these parts of the mechanism are driven in synchronism, as is required for the proper production and assembling of the box elements. It is quite immaterial how the various portions of the whole machine are connected together to secure this driving requirement, but it may be accomplished conveniently by applying power to a shaft of the mechanism "A" and by suitable shafts and gearing driving the shafts of the other associated parts of the machine therefrom.

Referring first to the main form device "A", (Figs. 14, 15, 16, and 17,) of which only a small portion is illustrated, it will be seen that this part of the whole machine is in many respects like that of United States Patent No. 1,054,473, Telfair, pasteboard box machine, granted February 25, 1913, and, in so far as the illustration of this patent may be used for this description, it has been omitted from the drawings in the present case, to reduce the number of drawings required. In the device of the patent, there is an intermittently-rotated spider or carrier on which are mounted four rectangular forms, and in the appliance "A" of the present machine, there is a similar spider 80 rotated step by step in the same manner and carrying four rectangular forms 81, 82, 83, and 84, somewhat different in construction from those of the patent, (Figs. 14, 15, 16, 17, and 23). It is on these forms that the necked or collared box-bodies are produced, the neck-blanks for the same being supplied from the device "B" and the rim-blanks from the appliance "C".

Each rectangular form 81, 82, 83, and 84, is mounted on the end-portion of one of the spider-arms on a hollow-shaft 85 (Fig. 14), extended through and revoluble in a bearing of the spider-arm. This shaft has fixed thereto a collar 86 provided with two bearings extended through the collar at right-angles to one another and accommodating two gripper-shafts 87 and 88. Shaft 87, at one end carries a gripper-finger 89 located near one corner of the rectangular form. At its other end, shaft 87 has an arm 90 fixedly mounted thereon and supplied with a roller 91. Shaft 88 at one end has a gripper-finger 92 coöperating with the form near another corner thereof, the shaft also having an arm 93 fixed thereto and equipped with a roller 94.

A disk 95, (Fig. 14), fixedly mounted on the opposite end of each shaft 85 has a tapered hole 96 therethrough adapted to receive the correspondingly-shaped end of a spring-pressed locking-pin 97 slidably mounted in the spider-arm 80. Obviously, this pin prevents the shaft and form from rotating on their own axes except when it is retracted.

In the device of Patent No. 1,054,473, each form has a pinion which at the proper time co-acts with a toothed segment (Fig. 4 of the patent), whereby the forms are successively rotated on their own axes. In the present appliance this feature of construction has been materially modified, each form being rotated, (after the forward end of the duplex rim-blank has been gripped thereto and while the carrier is in its next position of rest after the form has received the neck), by means of an intermittently-rotated clutch-member 98, (Fig. 14), which at the proper moment, by suitable means, (not shown), is automatically slid into clutching or operative engagement with a companion clutch-member 99 rigid with shaft 85. Mounted to slide with member 98, but not to rotate therewith, is a lug 100 adapted to engage a shoulder 101 of the lock-pin 97 and press back the latter before the clutch-members engage, the retraction of members 98 and 100 permitting the pin 97 to again lock the form to the spider or carrier 80.

The face of each form is recessed to receive a discharge or ejector plate 102 mounted on a rod 103 in the bore of shaft 85, the latter also accommodating a coil spring 104 bearing at 105 against an enlargement of the rod, such spring normally holding plate 102 housed within the face of the form. To prevent rotation of the plate relatively to the form, a pin 107, secured to the form slidingly fits into an aperture of the form support or collar 86.

Each spider-arm 80, by means of a pair of projections 108, 108, and a pair of retainers 109, 109, secured thereto by means of dowel-pins 110 and screws 11, provides a bearing for a cam 112 back of the form and oscillatory in said bearing, such cam having an arm 113 and a roller 114 thereon. Each of these cams, of which there is one for each form, is normally held stationary in its bearing and against a stop by a spring 115, but is subject to movement by another cam hereinafter described. From a consideration of this construction it will be clear that the gripper or jaw 92 is operated by its roll 94 coöperating with the cam 112 normally-stationary relatively to the spider, the cam however, being so positioned that after the form has completed part of its rotation on its own axis, the gripper 92 will hold a portion of the folded rim-blank to the form.

On a suitably supported stationary shaft 120, an arm 121 is mounted, extending upwardly between the position of the form when it receives the neck, which is its uppermost position, and its next successive position, (90° therefrom), where it receives the box-bottom and the rim or flange. On this fixer arm at 122, (Figs. 14 and 15,) a cam-track 123 is pivoted, the track being yieldingly pressed away from the arm by a coil-spring 124 surrounding a pin 125 screwed into the cam and projecting through a hole 126 in arm 121, the pin having a head 127, which limits the outward swing of the cam.

With this cam the roller 91 of the gripper 89 co-acts, and as the form moves from its uppermost position, having there received its neck, while the grippers were retracted by means described below, to the next position shown in Figs. 14, 15, roller 91 travels on the face of cam 123, the latter maintaining the jaw or gripper 89 retracted from the form and neck. Just slightly previous to the time when the roller runs off of the lower-end of this cam, the advance end of the duplex-strip (pasteboard and binder paper), is fed to a position under the form, and when the roller leaves the cam, the gripper-jaw 89, under the action of its spring 89ª, automatically grips such forward end of the blank and holds it to the form. Immediately upon the roller running off of the end of the cam, the latter, under the influence of its spring 124, swings out of the way of the roller so as not to interfere with the rotation of the form on its own axis and the rotation of the other elements associated therewith. When roller 91 is riding on the cam, the latter is forced back against the action of its spring 124, but such rearward swinging is limited by any suitable form of stop or abutment so that as long as the roller is on the face of the cam the gripper 89 is inoperative in an open position.

Also on shaft 120 there is mounted a stationary cam member 130, (Figs. 16 and 17), adjacent that position of the form where the discharge of the box-body therefrom occurs. This cam member 130 has two cam tracks 131 and 132, the former being on the side of the member 130, the latter on its edge. With the cam track 131 gripper-roller 91 co-acts and with the cam-track 132 the oscillatory-cam roller 114 coöperates. When the form, in its intermittent rotary movement, reaches the discharge position indicated in Figs. 16, and 17, in order that the necked box-body may be ejected or removed from the form, it is, of course, necessary to retract both jaws or grippers 89 and 92. This is accomplished so far as the jaw 89 is concerned, by its roller 91 riding up the stationary cam-track 131, and so far as gripper 92 is concerned, it is brought about by roller 114 running up cam-track 132, which causes a rocking of the oscillatory cam 112, this movement shifting roller 94 and moving jaw 92 away from the form. It will be observed, furthermore, that the lengths of cam-tracks 131 and 132 are such as to hold the grippers retracted until after the neck has been applied to the form in its uppermost position.

The necked box-body is removed from the form while the latter is in the position shown in Figs. 16 and 17, by a discharge mechanism, a portion only, 102, of which is shown, the remainder not being illustrated, but substantially like that of Fig. 20 of the Patent No. 1,054,473. Opposite the lowermost portion which the forms successively reach, there is a device practically like that of Figs. 5, 6, 8, and 9, of Patent 1,054,473, or any equivalent construction, for folding the protruding margins of the binder paper over on to the box-bottom, causing the paper to adhere thereto and thus securely uniting the bottom and rim. Inasmuch as this part of the structure is clearly set forth in the patent, it is unnecessary to illustrate it or describe it in detail here.

That part of the machine, —B—, for making the finish or paper covered necks of collars on the forms will now be described, (see Figs. 2 to 13 inclusive).

A neck pasteboard supply-roll or web 135, of a width corresponding to the total length of the four sides of the neck to be produced, is mounted on a shaft 136, (Figs. 2 and 3), adapted to rotate in bearings in the ends of two bracket-arms 137, 137, bolted to a table-top 138 supported on suitable legs 139, 139 and connecting-portions 140. In unwinding from roll 135, the pasteboard-web passes between lower and upper feed-rollers 141, 142, respectively, (Fig. 5), mounted on a superstructure 143 having a flat-top 144 on which the forward end of the pasteboard-web rests beneath a plate 145. This web is to be fed or advanced step by step so that successive neck foundations, that is to say, pasteboard-blanks, may be severed. To bring this about the following mechanism is used. The shafts 146 and 147, (Fig. 4), of the lower and upper feed-rollers respectively, not only have bearings in the supporting member 143, but they are also geared together by intermeshing gears 148, 149, and shaft 146 has a ratchet 150 fixed thereto with which a spring-pressed pawl 151 co-acts, such pawl being pivoted to a rock-arm 152 loose on shaft 146 and oscillated by a cam 153 on the main-shaft 154 of this part of the machine, by means of a forked link 155 pivoted at its upper end to the rock-arm and supplied near its lower end with a roller 156 in groove 157 of the cam.

Coming now to that part of the appliance for cutting off these neck pasteboard or foundation blanks, it will be observed that shaft 154 also has secured thereto a cam 158 (Fig. 5), in the cam groove 159 of which travels a roller 160 on a forked slide 161 guided above the table by an apertured bearing 162 in which it reciprocates. This slide rod has a collar 163 pinned thereto and has slidingly mounted on its upper-portion a knife support or presser 164 with two spaced bearings 165, 166, which receive rod 161, a spring 167 being interposed between the collar and the lower bearing 166. This constitutes a yielding or cushion mounting for member 164, which has a lower pressing face 168 and an adjacent knife or shear member 169 co-acting with a similar companion shear member 170 on the part 143.

Beneath the part 168 a presser-block 171 is mounted on the table and carries an inverted channel-member 172, a portion of which overlying the block 171 is above the top face of the block a sufficient amount to permit the passage of the protruding margin of the paper strip hereinafter referred to.

A spool, roll, or continuous web 175, (Fig. 2), of relatively-narrow cover or finish paper, is also provided, and the paper stripped therefrom is run over a glue or paste roll 176, around a roller 177, on to a horizontal guide 178 leading to the top of block 171. Retraction of the adhesive-coated strip is prevented by the usual pivoted dog 179.

The glue or paste roll shaft is desirably rotated by means of a grooved pulley 180 thereon and a crossed belt 181, and a similar pulley 182 loose on a suitably-journaled cross-shaft 183, (Figs. 2, 3, 4, and 6), the pulley 182 being intermittently-rotated from the shaft on which it is mounted by a pawl 184 pivoted to a face of the pulley and coöperating with a ratchet 185, keyed, or otherwise secured to the shaft, the latter being oscillated by means of a pinion 186 on the shaft and an intermeshing toothed sector 187, (Figs. 3, 4, and 7) on the top end of a lever-arm 188 (Fig. 2), oscillated by a cam 189 on a lower cross-shaft 190 driven from a main drive shaft 191 by bevel gears 192, 193, (Figs. 4 and 10).

Shaft 183 has a gear 194, (Fig. 6), fixed thereto and located between the elements 143 and 171, the latter being suitably recessed for this purpose, such gear meshing with the teeth of a reciprocating inverted rack 195 and equipped with an upstanding pusher lug or finger 196, (Figs. 3, 48 and 49) adapted to engage behind the rear end of the severed pasteboard blank and feed it, as well as the attached unsevered paper web along the top of the member 171 toward the knife, which cuts the paper.

As the pasteboard blank is advanced by the carrier, 196, from its position beneath the shears, pulling along with it the paper tape to which it is affixed, it comes to rest momentarily, and during such interval, the paper web is cut on a diagonal line, severing the paper blank from the continuous web, leaving a rearwardly-extended adhesive-coated paper tab or ear. This severing is accomplished by means of a revolving blade 200, (Figs. 2, 3, and 7), arranged to coöperate with the forward-end of the support or block 171. The blade 200 is removably mounted within a disk 201 (Fig. 7) of a shaft 202 journaled in a bearing 203 and carrying a bevel gear 204 in mesh with a similar gear 205 mounted on a vertical shaft 206 suitably journaled in bearings 207 and 208 and having fixed upon its lower end a bevel-gear 209 in mesh with a companion gear 210 on shaft 154.

The revolution of the blade being timed to correspond to the reciprocation of the carrier or pusher, the paper-strip is severed on a diagonal line after the duplex-blank of foundation pasteboard and finish or cover paper is released by the lug or shoulder 196 of the carrying rack 195 and during the return stroke of the carrier, any retrograde movement of the paper web being prevented by the action of dog 179 (Fig. 2), bearing frictionally at an incline upon the paper web as it rests upon its support.

The carrier having returned to its rearmost position, the shears are actuated to sever another blank of pasteboard and as such blank drops upon the underlying adhesive-coated paper-web beneath the shears, it will be seen from an inspection of Fig. 5, that the two are not in register vertically, the rear longitudinal edge of the pasteboard-blank extending beyond the corresponding edge of the finishing-strip and the opposite edge of the latter projecting beyond the corresponding edge of the former, these positions being assured by the presence of member 172 beneath a portion of which the protruding paper is accommodated. This provides for the shoulder 196 of the carrier-rack 195 engaging the rear end of the pasteboard blank at one side of the paper-strip and also leaves a protruding edge of the paper strip to be hemmed or folded over the front edge of the pasteboard blank and back on to the upper face of the same as a binding or finish cover. This folding is accomplished during the passage of the duplex blank through the longitudinally-channeled hemming or folding member 211, (Figs. 2, 3, 8, and 9), the wall of which is curved or shaped somewhat similar to the hemmer of a sewing machine, whereby, as the blank passes through the same the projecting edge of the paper strip is progressively turned upward and then over on to the upper face of the pasteboard blank, to which it is caused to adhere by the adhesive previously applied to the paper.

The lower wall of the hemming or folding device is cut away to provide a longitudinal slot 213, (Fig. 9), in alinement with the path of the carrier 195, so that during the passage of the duplex strip through the hemmer or folder the longitudinal margin of the pasteboard blank, which is not covered by the finishing-material, overhangs such slot. A second bath 214 of adhesive, and preferably, a glue or paste, (Fig. 8), is located beneath the folder 211 and within such bath is mounted to rotate a paste or glue roller 215 upon a shaft 216, which is detachably coupled to a driven-shaft 217 by means of co-acting ratchet faces formed on two disks 218 and 219. Shaft 217 is driven by means of a sprocket-wheel 220 through a sprocket chain 221 from a sprocket 222 fixed on cross-shaft 190. The adhesive-containing vessel 223 is held in place with its driven disk 218 in engagement with the driving disk 219 by means of a set screw 224 threaded in a bracket arm 225 and engaging the concave upper face of a standard 226 which may be formed integral with the vessel 223. Upon loosening screw 224 the vessel 223 can be readily removed from beneath the bracket-arm and the shaft 216 uncoupled from the companion shaft 217. If desired, any suitable device may be employed for regulating the amount of paste or glue which will be applied by roll 215 to that narrow longitudinal portion of the pasteboard blank referred to. This adhesive is to be employed for uniting the neck to the box-body, which is subsequently built around it.

After the severing of the paper web or tape by the revolving cutter 200, the composite blank is further advanced by the engagement of its forward end with a mutilated or cut-away feed-roller 230, (Figs. 3 and 10) on a shaft 231 journaled within blocks 232 and 233 yieldingly pressed down by springs 234, 234, in standards 235, 236. Arranged immediately below feed-roller 230 is a companion friction feed-roller 237 carried by a shaft 238 journaled in the uprights 235, 236, which, of course, serve as supports for blocks 232 and 233. Upon the front ends of shafts 231 and 238 are mounted respectively intermeshing gears 239 and 240 and upon shaft 238 there is also fixed a sprocket wheel 241 by means of which the two shafts are driven through a sprocket-chain 242 from a sprocket-wheel 243 carried by cross-shaft 190.

It will be seen that the forward end of the duplex blank rests stationary upon the friction roller 237 during the time that the cut-away portion of roller 230 passes thereover and that as soon as the larger or uncut part of the roller reaches a position opposite roller 237 the end of the duplex blank is gripped between them and fed forwardly, being at the same time compressed or squeezed to insure intimate contact of the overlapping portions of the finish and foundation strips. As is illustrated, neither of the rollers contact with that part of the cardboard strip provided with the adhesive supplied by roller 215. The extent of the unmutilated peripheral edge of the roller 230 is sufficient to cause the same to feed the duplex strip forward at least a distance corresponding to the travel of the reciprocatory carrier or pusher so that as another blank is advanced the preceding one will have moved out of the way. From these rollers the strip passes to additional feed-rollers 251, 252, (Fig. 2).

Turning now to that part of the device which folds or bends the flat duplex neck strips around the forms on the intermittently-rotatable carrier of the part —A— of the mechanism, (Figs. 11, 12, and 13), it will be observed that on the table-top of this portion of the machine a guide-member 244, (Fig. 12), is mounted, having guideways 245, 245, receiving a slide 246 equipped on its under side with a rack 247 with which a toothed sector 248 coöperates, the latter being mounted on a suitably-supported shaft 249 oscillated by mechanism, (not shown), from one of the lower shafts of the device of Patent 1,054,473, of which a part of the table, forms, and form spider or carrier are shown in these three figures.

This slide carries a shelf or ledge 250 on to which the flat composite neck-blank is fed by the mechanism —B— by any desirable feeding-means, such as the power-driven feed-rollers 251, 252, (Fig. 2), and drop-roller 253, and roller 254 (Fig. 12), the power-drive for which has been omitted from the drawings for clearness of illustration.

As is shown in Fig. 13, this supporting ledge or guide, which has side guiding-ribs 255, 256, to maintain the neck-blank from lateral displacement when it receives the neck-blank from the part —B— of the machine, is out of the path of travel of the forms 81, 82, 83, and 84, but the rack 247 and sector 248 are the means provided for advancing the blank laterally beneath the adjacent uppermost form around which it is bent during an interval of rest of the form-carrying spider.

The appliance includes means to raise the blank against the bottom of the form 81 and hold it there during the folding operation. This means comprises a bar 257 with upstanding lugs 258, 258, (Fig. 12), adapted to rise through apertures in the guiding and supporting ledge 250. Bar 257 is mounted on and at one side of a vertical rod 259, (Fig. 13), slidable in bearing 260 on member 246, the lower end of such rod having a roller 261 coöperating with a cam 262 rotated by means, not shown. When the slide 246 is retracted as shown in Fig. 13, the roller 261 is out of register with the enlargement of the cam 262, but it will be in such register when the slide is advanced to the form and the rotation of the cam will lift the ears 258 which carry the neck-blank on the ledge 250 up against the bottom of the form and maintain it there during the folding operation now to be described.

The device also includes two side folders 265, 266, (Figs. 11 and 12), and a top folder 267. Folder 265 of right-angle shape, (Fig. 11), is secured to an arm 268 rigid with a shaft 269 journaled in slide 246 and having at one end a sector 270. As is indicated in Fig. 11, the ledge 250 is recessed at 271 and 272 for the accommodation of both folders 265, and 266. Folder 266 of double right-angle formation has a part 273 to coöperate with the side of the form and a portion 274 to co-act with the top surface of the form, and is fastened to an arm 275 on a shaft 276 also journaled in part 246 and supplied with a toothed sector 277 meshing with sector 270. The shaft 276 has another toothed sector 278 meshing with a similar sector 279 on the shaft 280 likewise journaled in slide 246. At its end shaft 280 has a gear 281 in mesh with sector 282 on an upper shaft 283, which adjacent to the form has an arm 284 fixed thereto carrying the right-angle folder 267. These three folders which are all geared together, as indicated, are operated by a sector 285 of considerable width so as to remain in mesh with gear 281 during the sliding travel of the latter, such sector being fulcrumed at 286 in a standard 287 and rocked by a link 288 pivoted to the lower end of sector arm at 289. Link 288 is operated from one of the drive-shafts of the device of Patent No. 1,054,473 by means, not shown, to prevent complication of illustration.

It will be readily understood that the duplex or composite flat neck-blanks made by that part of the appliance set forth in Figs. 2 to 10, inclusive, are individually fed lengthwise to the ledge 250, while the latter is in the retracted position shown in Figs. 11 and 13. In Fig. 11 one of such neck-blanks 75 is shown, the ledge and the blank being of substantially the same length as illustrated. After thus receiving the blank, the ledge, the blank thereon, and the folders, advance to the uppermost form 81 which is now temporarily stationary, and the neck is bent around the form by the three folders indicated while it is held against the bottom thereof. Folder 267, by reason of its shape, applies the adhesive-coated triangular paper tab or ear 76 around the corner of the neck, which acts thereafter to hold the completed neck on the form. The folders rock away and the slide and ledge move back to receive the next neck blank, and during such action the carrier steps the form around to the next position, bringing the succeeding form into place for the reception of its neck. In this way, each form is provided with a covered neck or collar of the character indicated.

The necked form 81, having been moved from its uppermost position to the position occupied by the form 82, is now ready to receive the box-bottom, rim, and binder-strip. The mechanism —C— for accomplishing this result is illustrated in Figs. 18 to 38 inclusive, and this part of the machine is on the opposite side of the portion —A— from the part —B—, as is well shown in Fig. 1.

On brackets 300, (Fig. 27), fastened to the main-frame 301 a roll or continuous web 302 of binder or cover paper, cloth, or the like, is mounted, but in describing the machine it will be referred to simply as paper. The paper strip, which is of a width corresponding to the length of one of the binder strips for a box-body, passes upwardly from the roll 302 between two feed-rollers 303, 304, the shafts 305, 306 of which are supported in any approved manner in the frame and are associated together by gears 307, 308 thereon, a gear 309 on shaft 306 being in mesh with a gear 310, the latter also coöperating with a companion gear 311 connected to a ratchet-wheel 312, with which a pawl 313 co-acts, such pawl being pivoted on a bell-crank arm 314 oscillatory on the shaft supporting gear 311 and ratchet 312. This arm is rocked by means of a forked member 315 pivoted at 316 to the arm 314, its bifurcated part straddling a main longitudinal drive-shaft 317 and having a roller 318 traveling in a groove of cam 319 on the shaft.

Shaft 317 is rotated by means of gears 320, 321, 322, and 323, connecting such shaft to the main shaft of the part —A— of the whole machine, which receives power for the driving of all other sections of the machine. Of course, the type of driving connection between these parts of the machine is wholly immaterial. In advancing from the feed-rollers the paper web or strip passes between a bottom support 324 (Fig. 27), and a plurality of upper guides 325 over a resilient support 326, (which may be a flat metal spring), on to a fixed supporting part 327, (Fig. 29) of the machine, and beneath a series of fixed fingers 328. A number of movable hold-down fingers 329, 330, and 331, (Figs. 29, 30, 31, and 32) are also employed above the paper and support 327, the elements 330 and 331 being fixed on a rock-shaft 332. Such shaft is oscillated by means of a cam 319 (Fig. 27), whose cam edge works on a roller 334 on a rock-arm or lever 335, the other end of which by means of a link 336 is connected to an arm 337 fastened to shaft 332.

Finger 329 is loosely mounted on shaft 332, but an adjacent knife-arm 338 is rigidly secured to the shaft and has two cutting knife-edges 339 and 340, (Figs. 31 and 32) at right-angles to one another, such knife projecting beneath the finger or arm 329. The knife edges or blades co-act with the margins of a cut-away section of the support 327 in the usual manner and in operating remove a section of the paper blank at one end thereof.

Knife-arm 338 (Fig. 32), has an upstanding threaded stud 341 projecting through a hole of arm 329 and beneath the latter such stud has a nut 342 and above the arm the stud is encircled by a coil-compression spring 343 bearing at its lower end against the top face of the arm and at its upper end against nuts 344 on the stud. Obviously, when the shaft 332 turns, fingers 329, 330, and 331 will engage the advance portion of the paper-web, holding it securely against the part 327, continued downward movement of the knife-arm being permitted and resulting in cutting a right-angle slit in the paper, which removes a corner portion of the same, the piece of paper cut falling down through an aperture provided for that purpose. The fingers 330 and 331 may be resiliently mounted on the shaft or have resilient portions engaging the paper, or may be so positioned on the shaft that they engage the paper slightly after the arm 329 engages it.

At about the same time the paper-blank is severed from the continuous paper-web by another means constructed substantially as follows:

On a shaft 350, (Figs. 27 and 33), journaled in the machine-frame, two arms 351 are secured, and at their free ends there is adjustably-mounted a knife-bar 352 carrying a knife blade 353 located above the flat spring support 326 and adapted to coöperate with the adjacent shear part 354, the member 326 flexing or yielding during the cutting action. Shaft 350 is rocked by means of an arm 355 secured thereto and connected bar 356 actuated by cam 357 on shaft 317 (Figs. 27 and 28).

After the paper-blank has thus been severed from the web and a portion cut out of it at one corner, as described, it is advanced to the under side of a rotary feed cylinder to which it is gripped, and while thus held and moving with the cylinder, its outer face is coated with glue or other appropriate adhesive. The feeding-means comprise the following instrumentalities:

Drive-shaft 317 (Fig. 27), by means of bevel gears 360 and 361 rotates a cross-shaft 362 journaled in appropriate bearings and supplied at its end with a gear 363 in mesh with an upper intermediate gear 364, the teeth of which in turn co-act with those of a gear 365 on an upper longer cross-shaft 366 on which the feed-cylinder 367 referred to is mounted. A gear 368 on shaft 366 drives a gear 369, (Fig. 22), in mesh with a companion gear 370, and the shaft 371 of the latter has another gear 372 meshing with a gear 373 loose on a lower shaft 374 supported in standards. Fixed on this latter shaft are a pair of bracket-arms 375 supporting at their free ends a short shaft 376 equipped with a gear 377 meshing with gear 373 and also equipped with an upper rubber-surfaced paper-feed roller 378, (Figs. 22 and 30), co-acting with a similar lower roller 379, not power-driven, but projecting upwardly slightly through an aperture 380, (Fig. 29), in the paper-blank support 327.

Shaft 374 has an arm 381 (Fig. 22), rigidly secured thereto and connected by a link 382 to an arm 383 on a rock-shaft 384. This shaft is oscillated by means of an arm 385 (Fig. 22), mounted thereon and carrying at its end a roller 386 traveling on the periphery of a cam 387 on shaft 366. By this means, at the proper moment the upper feed-roller 378 descends, engages the severed paper-blank, and advances it to the feed-cylinder 367 now to be described. Having completed this feeding operation, the roller again rises and later descends at the proper time to feed the next severed paper-blank. The feed-cylinder or segment 367 around about half of its periphery is grooved at 390, (Fig. 36), the groove being of a width corresponding to that of the paper-blank. On each side of the cylinder or segment at 391 there is pivoted a small bell-crank 392, one arm of which has a roller 393, the other arm having fastened thereto a bent finger 394 with an inwardly-turned terminal-portion registering with the groove. Each of such gripper-fingers is pressed toward the cylinder or segment groove by a coil expansion-spring 395 accommodated between the roll carrying arm of the bell-crank and the hub 396 of the segment.

On opposite sides of the segment there are two stationary cams 397 and 398 fastened to the machine-frame and on which the rollers 393 ride. These cams are so shaped that when the advance end of the paper-blank arrives beneath the segment the fingers will grip it and hold it thereto during the revolution of the cylinder, until such advance end of the paper-strip reaches its uppermost position above the segment shaft, at which place the fingers automatically retract and the paper leaves the cylinder or segment, passing on to a support 495 (Fig. 19), and meeting the pasteboard-rim blank which becomes adhered to it at this point. A glue-roll 399, (Fig. 22), supplied with adhesive from any desirable source, (not shown), as from a heated glue bath into which it dips, is positioned to travel on the paper-blank as the latter revolves with the cylinder or segment, that part of the latter not covered by the paper being cut away, as shown in Fig. 34, so that the glue roller does not touch it. For the same reason the cylinder is recessed at 399$^a$ in register with the notch cut out of the paper strip, so that the glue-roller will not apply adhesive to the cylinder at this point, but, of course, the adhesive covers the entire face of the paper.

We will now trace the production and travel of the pasteboard rim-blanks to which these binder-paper blanks become adhered to form the composite strips required.

Referring to Fig. 24, it will be apparent that a roll or continuous web 400 of pasteboard is provided of a width equal to the length of the severed rim-blank. This roll is revolubly supported at 401 on outstanding brackets 402. The pasteboard strip passes upwardly from the stock-roll between three upper rubber-covered feed-rollers 403, (Fig. 25) fixed on a shaft 404 geared to a lower-shaft 405 (Fig. 24) by gears 406 and 407, this latter shaft carrying a feed-cylinder 408, (Fig. 25).

These coöperating feed-rollers are rotated by means of a gear 409 (Fig. 24) on shaft 405 meshing with an intermediate gear 410, which in turn meshes with another gear 411 on the end of a short-shaft 412 (Figs. 24 and 25) journaled in the machine-frame, and the inner-end of which is equipped with a ratchet 413 manipulated by a pawl 414 on a bell-crank rock-arm 415 loose on shaft 412 and oscillated by a bifurcated bar 416 pivoted to one of the bell-crank arms at 417, the opposite end of the bar straddling shaft 317 and having a roller 418 in a cam groove or cam 419. By this means the feed-rollers are actuated intermittently or step-by-step to advance the pasteboard-web forwardly amounts corresponding to the width of the blanks to be produced.

From between the feed-rollers, the pasteboard-web passes over a table 420 beneath a vertically-reciprocable knife-blade 421 mounted on a bar 422, (Fig. 25), having end-portions 423, (Figs. 18 and 25), sliding in upright guideways 424. Bar 422 is operated by means of a shaft 425 (Figs. 24 and 25), journaled in the upper part of the frame structure and connected to the bar by a pair of crank-arms 426, 426, and connecting-rods 427, 427. Shaft 425 is rocked by a cam 428 on shaft 317 in a groove of which a roller 429 travels, the roller being on a rod 430 straddling the shaft and connected at its upper-end to a crank-arm 431 on shaft 425.

In front of the reciprocating-knife 421, there is a stationary supporting-plate 432 (Fig. 18$^a$) on to which the severed blanks fall. A plurality of guiding or holding strips 433 are mounted above plate 432 on a bar 434 and beneath such strips and against the edge of stop-bar 434 the severed blank is advanced by a pushing or feeding means constructed as follows:

A rock-shaft 435 (Figs. 21, 24, and 25), is oscillated by the cam-edge of cam 419 previously referred to on which a roller 436 on a bar 437 travels, such bar being pivoted to a short arm 438 on shaft 435. This latter shaft has clamped thereto a plurality of bifurcated arms 439, each of which at its upper end is operatively associated with a rod 440 (Figs. 24 and 26) slidingly mounted in an apertured boss 441 beneath table 420. At its front end each of such rods has a flat upstanding finger 442 fastened thereto, its top end in the retracted position of the finger being accommodated in a recess or cavity 443 in the under side of the stationary knife-member.

The severed blank when cut off falls in front of these fingers, which then emerge from their individual cavities and travel forwardly in slots 444 of plate 432, pushing the blank against the stop 434 and under the guides 433, it being understood that the fingers are long enough to project above the top surface of plate 432, but not above the top of knife 420$^a$. (See Fig. 26.)

The severed pasteboard-blank 449 is now ready to be fed to meet the adhesive-coated paper-blank and the mechanism for accomplishing this comprises the following parts:

In a bearing 450, (Fig. 18$^a$), a rock-shaft 451 (Figs. 18$^a$ and 21) is mounted, such shaft having keyed or pinned thereto a bracket 452 in the end of which loose on a stub-shaft there is a gear 453 to which is secured a rubber-faced feed-roller 454 above the pasteboard-strip after it has been advanced under the fingers 433. Gear 453 is in mesh with a gear 455 loose on shaft 451, such latter gear being driven by another gear 456 on a counter-shaft 457 driven by a gear 458, at its opposite end, which in turn is connected to a gear 459 on shaft 460 (revoluble in bearings 461, 462), by a train of gears 463, 464, (wide-gear) and 465. Shaft 460 receives its power through a gear 466 connected to the previously-mentioned cross-shaft 366 by means of coöperating gears 467, 468 and 365, (Figs. 21 and 22).

It is, of course, necessary to have feed-roller 454 elevated when the pasteboard-blank is advanced by the pushers 442 and to lower it into contact with the blank at the proper time to feed it to the supplemental feeding means described below. This is accomplished by an arm 470, (Figs. 18 and 21), rigid with the shaft and pivoted to a bar 471 divided or recessed at its other end to receive shaft 460, this bar carrying a roller 472 coöperating with the cam 473 on shaft 460.

To secure an effective feed by drop roller 454, the shaft 474 of gear 463 beneath the drop roller has a companion lower rubber roller 475 projecting slightly above the surface supporting the blank, such roller, of course, rotating under power by the shaft supporting it. The blank is, therefore, squeezed between these two rollers as it is fed by them.

Shaft 460 has mounted thereon in alinement with the drop roller 454 a mutilated blank-feeding roller 476, (Fig. 18a.) Beneath it is another small feed-roller 477. A short crossshaft 478 is connected to the lower roller 477 by intermeshing gears 479, 480, and is driven by gear 465 by means of a gear 481 meshing therewith and mounted on shaft 478. Rollers 476 and 477 obviously assist in feeding the pasteboard rim blanks along, receiving them from the rollers 454 and 475. Above the feed cylinder or segment 367 a rubber feed-roller 485 (Fig. 19) is fixed on a shaft 486 revoluble in bearings of two supporting bracket-arms 487, 488, fixed to a shaft 489 journaled in the machine-frame. Shaft 486 has a drive-gear 490 intermeshing with the gear 491 loose on shaft 489 and co-acting with a gear 492 on a conveniently supported jack-shaft 493 rotated by gear 368 through gear 494. The bracket arms 487, 488, and the elements carried thereby may remain stationary, being supported in any desirable manner, or the roller 485 may be made to rise and descend in proper timed relation to the operation of the other parts by a cam oscillation of shaft 489 by means not shown, but well understood.

When the forward end of the glue-coated binder-paper blank reaches the top of the feed-cylinder or segment 367, the grippers 394 release it and it passes on to the top of a flat support 495 (which, if desired, may be provided with side guides). Slightly previous to this the advance end of the companion pasteboard blank has arrived at the same point and the latter is pressed against the upper glue-coated face of the paper strip by a roller 485, the two parts forming a flat duplex rim-blank with the paper projecting laterally beyond both longitudinal edges of the pasteboard. The pasteboard at the front end of the blank projects beyond the paper and the paper at the rear end of the blank extends beyond the pasteboard as shown in Figs. 57, 58, 59 and 60.

The composite blank is then fed still farther forward by other rollers, as follows:

On a transverse-shaft 500 revolubly supported in bearings 501, 501, (Fig. 19), there is a feeding sector or mutilated disk or roller 502 driven from shaft 366 by gears 503, 504, on shafts 500 and 366 respectively, and intermediate gears 505 and 506. A supplemental lower roller 507 is located below the roller or disk 502, projecting slightly through an aperture in plate 495. Such roller 507 is revolubly supported in a pair of hinged bracket arms 508, 509, vertically adjustable by screws 510 and 511. If preferred, this under roller may also be power-driven.

Another pair of feed rollers in register with the others described above is also employed to cause the blank to travel along. The upper one 512, (Fig. 19), is fastened to a shaft 513 revoluble in bearings in two arms 514, 515, fast on a cross-shaft 516. Shaft 513 carries a gear 517 working with a gear 518 rotatably mounted on an arm 515 which meshes with another gear 519 loose on shaft 516. This latter gear co-acts with the gear 520 on a short transverse shaft 521, the other end of which has a gear 522 in mesh with gear 503. By these means roller 512 is rotated.

Beneath it is a complementary power-driven roller 523 operated from gear 520 by intermatching pinions 524, 525, 526, and 527, of which the gear 524 is wider than the others to co-act with the two offset gears 520 and 525. Roller 512 does not rise and fall, but may be made to do so by providing means to rock shaft 516 slightly.

Before the duplex blank reaches rollers 512 and 523, that projecting longitudinal edge of the paper from which the small section was removed by the knives is folded over on to the top face of the blank and caused to adhere thereto. This result is secured by means of two stationary folders 530, 531, the first bending the paper up over the pasteboard edge, the second folding it over on to the top face of the pasteboard blank. If desired, a single, suitably-shaped sheet-metal hemmer or folder 532, (Fig. 38) may be employed for this purpose. The blank immediately passes beneath roller 512 which, as well as feeding the blank, rolls the turned glued paper into secure contact with the top face of the pasteboard.

It will, of course, be understood that all of these various feed rollers are in such position and of a width to avoid contact with the glue-coated face of the projecting part of the paper.

There is still another feed disk or sector, 535, (Figs. 20 and 23) on a cross-shaft 536 journaled in bearings 537 and 538, this shaft being rotated by interfitting beveled gears 539, 540, of which the former is on crossshaft 536, the latter being on a supplemental lengthwise shaft 541 revoluble in bearings 542, 543. Shaft 541 receives power by means of bevel gears 544, 545 from shaft 500, (Fig. 19).

Roller or disk 535 has a lower companion roller 546 supported in brackets 547, 548. As in a preceding instance bracket-arm 547 is adjustable by means of screws 547ª, (Fig. 23). Roller 546 is rotated by means of co-acting gears 549, 550, the former being on shaft 536 and the latter operatively associated with the roller.

In order to press the blank down on the supporting ledge 551 as it passes along so as to place a resistance to its free travel, a presser-arm 552 is fulcrumed at 553 in a small standard 554, the lever carrying a roller 555 riding on the edge of a cam 556 on shaft 536. A spring 557 holds the arm down to its work, but at the proper time the cam raises it to permit the passage of the advance end of the next blank and to prevent it from contacting with the trailing glue-coated paper tabs of the blanks. On its lower face member 552 is grooved to receive about half of the width of the rim strip.

Upon leaving the ledge 551 and the presser 552, the front end of the blank passes beneath the adjacent form 82 and is clamped thereto, but in order to assist in folding the blank around the form during the rotation of the latter on its own axis, a roller 560, (Fig. 23), is mounted on a bent-arm 561 fixed on a shaft 562, having a depending arm 563 pressed by a spring-actuated rod 564. Shaft 562 also has another arm 565 rigid therewith and by means of a link 566 is connected to a bell-crank lever 567 equipped with a roller 568 cooperating with a cam 569 on shaft 536. The spring forces the roller toward the form, whereby the roller may assist in the bending of the rim-blank, and it also wipes the trailing paper-tab over the rim joint, causing it to adhere in place. Just before the carrier begins to revolve to take the form to the next position of rest, cam 569 retracts arm 561 and its roller sufficiently to be out of the way and again permits it to move into operative position at the proper time.

The timing of the operation of the parts is substantially as follows:

The paper-blank is severed from its web very slightly ahead of the cutting of the cardboard-blank from its supply. When the advancing composite blank is in position where its front end has just been clamped to the form, the next duplex blank is just about to come to the paper folder and a pasteboard strip just cut from its web is about to be engaged by its feed-roller. At this time a paper-strip is on the feed-cylinder and in engagement with the glue-roller. In Figs. 1, 2, 3, 11, 12, 13, and 14 of United States Patent No. 1,054,473, there is shown an upright-magazine for holding a supply of box-bottoms and operating-means for individually removing such bottoms and applying them and holding them against the forms as they successively come to the proper positions and maintain them against the forms during their rotation on their own axes. A like or similar means is provided in the present machine opposite form 82, and a fragment of this part of the device is shown in Figs. 11 and 12 and characterized 570.

When each form reaches the position 82 shown in Figs. 20 and 23, one of these box-bottoms is applied to it just previous to the bending of the duplex rim around the form so that such rim is folded not only around the form but also around such bottom.

After each form has received its paper-covered neck in the position of the form characterized 81, and has also received the paper-covered rim and the bottom opposite the duplex-rim blank producing mechanism, in the position of the form characterized 82, the carrier moves the form to its lowermost position 83, where it temporarily remains stationary and where the protruding adhesive-coated margin of the binder-paper of the rim is folded over and adhered to the outer face of the bottom by means, (not shown), substantially like that of Figs. 5, 6, 8, and 9 of Patent No. 1,054,-473.

The carrier then moves the form upwardly to its fourth position of rest, 84, at which place the finished necked box tray or body is discharged by a means, (not shown), similar to that of Fig. 20 of Patent No. 1,054,473 into a chute or on to a conveyer or belt of desirable construction, shown diagrammatically in Fig. 1. Of course, it is necessary for the two form grippers 89 and 92 to back away from the form to permit such discharge, and this is effected by the action of the stationary cam 131 on gripper 89 and the shifting of cam 112 by stationary cam 132 which retracts gripper 92, (Figs. 16 and 17).

Referring now to that part of the machine which makes the box-covers with marginal rims adapted to fit over the necks of the box-bodies, attention is directed to the fact that the portion —E— of the appliance is substantially like the part —A— having the same form carrier, forms, means for folding the binder paper over on to the heads, head-feeding means, ejecting-mechanism, etc. It does not have any mechanism for initially applying or folding a neck about the form, but does have additional means for folding the binder-paper tab into the box-cover, such tab or ear being somewhat different on the cover from that of the box-body.

The cover-rim blank producing parts —D— of the machine, which works in conjunction with the appliance —E— is the same in structure as part —C— except for the following noted changes, reference being had to Figs. 39 to 44 inclusive. The severed binder or cover paper blank, instead of having a portion of it cut out at one corner is merely slit transversely to a small extent, leaving a tab to cover the rim joint, the edge of which tab is also folded over into the cover and adhered to the inner face of its rim. Instead, therefore, of using two knives 339, 340, at right-angles to one another, this part of the machine has only a single knife 600 (Figs. 39, 40, 41), corresponding to the knife 339. Otherwise, the two paper-cutting mechanisms are alike.

The feed-cylinder in this part of the appliance differs from the other one only in that it has no cavity corresponding to the notch cut out of the paper, because in this case, since the paper is merely slit and no portion of it removed, there is no requirement for such cavity or recess.

Owing to the fact that the paper tab of the rim in this part of the mechanism is of different size and shape from that in the previous instance and is to be folded over into the interior of the cover, the paper-folding means is necessarily different. Therefore, instead of using two stationary folders 530, 531, or a single substitute stationary folder 532, two coöperating folders are employed, the one stationary and the other movable, as is illustrated more clearly in Figs. 42 and 43. As in the previous instance, the folder 601 turns the edge of the paper on the blank upwardly over the edge of the pasteboard, and the folder 602 receiving the paper from this position folds it over on to the top face of the pasteboard blank. In this case it is desirable to leave the tab projecting beyond the longitudinal edge of the pasteboard blank unfolded, and to accomplish this the folder 601 instead of being stationary is mounted on the top end of a rod 603 slidable in a bearing 604 and reciprocated by means of a cam 605 on shaft 366, which coöperates with a roller 606 on a bar 607 straddling the shaft at one end and pivoted at 608 to an arm 609 of a suitably-journaled shaft 610, the other end of which is equipped with an arm 511 having a loose pivotal connection 612 with the lower end of the sliding rod 603. The construction is such that when the advance end of the tab comes to the folder 601 the latter rises out of the way so that the tab passes unfolded beneath this folder and also beneath the companion folder 602 which at its base is slotted to permit such travel of the tab without any bending or folding thereof. Stated somewhat differently, the folder 602 is only operative provided the tab has been previously partially bent by the folder 601.

In part —E— of the machine, when the cover 620 (Fig. 44), is discharged from the form, it does not pass directly to the discharge-chute or conveyer-belt, because it has an outstanding paper-tab 621, previously referred to, requiring folding down into the open mouth of the cover. Consequently, this part of the machine has means for doing this comprising a chute 622 provided with a stationary folder or hemmer 623 through which the covers are successively pushed by a reciprocating member 624 operated in any approved manner, illustration of its actuating-means being omitted in the drawings. When the box-cover 620 is ejected from the form 84, this flap of paper 621 is located on its top and projects beyond the pasteboard rim. When pusher 624 forces the cover through the chute to the position N in register with plunger 627, such tab or flap is bent down over the edge of the pasteboard wall, that is, over the open mouth of the cover. While the cover is stationary at this point the reciprocating folder or plunger 627 enters the cover through the aperture in the side of the chute and folds the tab into the cover and against the inner-face of the rim, to which it adheres. Folder 627 then recedes and the advance of the next cover moves the one under consideration from position N to position P from which it is successively fed into the succeeding positions Q, R, S, T, etc., between guides 628 and 629 by means of a reciprocating pusher or feeding-appliance 630. Although in Figs. 44 and 45 a box element is shown passing through the chute 622 and hemmer 623, it is to be noted that this is an intermediate position in its continuous travel to the position N.

The part of the machine characterized —F— is substantially like the appliance of United States Patent No. 1,141,502, which receives the necked box-bodies at one end and the covers at its other end, assembles such bodies and covers and discharges them below into a conveyer 631, such united bodies and covers being then ready for labeling. Each end of the machine —F— has a suitably-shaped sheet-metal turning device 632, 633 (Fig. 1), which turns the vertically-disposed bodies and covers into horizontal position prior to their assembling.

In Fig. 1, I have shown merely diagrammatically the driving arrangements between the various portions of the machine, but any appropriate means for operating the different parts of the machine in proper timed relation would suffice.

Operation: Referring to the operation of this machine, it may be summarized as follows, the description applying to what occurs on each form, it being understood that the various forms at all times have upon them boxes or covers in various stages of completion.

Referring to Fig. 47, it will be apparent that the advance end of the pasteboard-supply roll strip is brought over the advance end of the unsevered paper strip unwinding from its supply roll, the cardboard blank is then cut off as shown in Fig. 48 and brought into contact with the adhesive-coated paper. The two are then carried forwardly, the paper margin folded over the edge of the pasteboard, and the paper severed just to the rear of the cardboard-blank, as shown in Fig. 50, the flat duplex complete neck-blank being shown in Fig. 51. This is folded around the form as illustrated in Fig. 52, the tab being bent around the corner to hold the neck to the form, as shown in Fig. 53, the completed neck being illustrated in Fig. 54.

Referring now to the manufacture of the box-body around the neck on the form, it will be observed that the pasteboard rim blank is severed from the supply roll, as in Fig. 55, the paper-blank being severed from its supply roll and a notch cut out, as indicated in Fig. 56, the paper-blank being coated with adhesive while passing around the feed-cylinder shown in the same figure. The two blanks are then brought together in the relation illustrated in Fig. 57, after which the margin of the paper is folded over one edge of the pasteboard, as depicted in Fig. 58. A duplex rim-blank is delivered in proper register to the form and neck thereon by the feeding means specified, and any suitable guide, and its advance end is clamped to the form already supplied with its neck, the box bottom at the proper time being also brought to the form, as shown in Fig. 59. Then the form with its associated parts is revolved on its own axis, folding the rim around it and over the neck and bottom, being held to shape by two grippers. (See Fig. 60). Fig. 61 indicates the completion of the folding of the rim. The binder-paper, however, projects beyond the box-body bottom, as shown in Fig. 62, the two opposite portions being then wiped down on to the outer face of the bottom, as in Fig. 63, whereupon the other two portions are wiped over the bottom, as in Fig. 64. In this way a complete necked or collared box-body 77 is produced.

The box-cover is manufactured somewhat similarly. The pasteboard-blank is cut from the stock on the supply-roll, as in Fig. 65. The paper-blank is cut from its supply-roll and slit slightly transversely, as in Fig. 66, and the paper-strip is coated with glue while it is gripped to its feed-cylinder, as is also shown in Fig. 66. Then the two blanks are brought together and adhered one to the other, as in Fig. 67. Now the major portion of the projecting margin of the paper is folded over on to the pasteboard, leaving an extended tab as in Fig. 68. The head is then brought to the form and the advance end of the duplex strip clamped to the form, as in Fig. 69. The form is now rotated on its own axis, bending the rim around it, as in Fig. 70. The binder-paper projecting beyond the head is then caused to adhere to the latter in the same manner as is illustrated in Figs. 63 and 64 and the paper tab is folded into open mouth of the cover, as shown in Fig. 72, by means shown diagrammatically in Figs. 44, 45, and 46.

Then each box-body is fitted with one of the covers, the beginning of the assembling operation being as shown in Fig. 73, Fig. 74 showing the complete closed box.

While in this application this desirable embodiment of the invention has been set forth in considerable detail, it is not to be understood that the invention is limited and restricted to the precise and exact mechanical features depicted, because these may be varied within comparatively wide limits without departure from the substance of the invention and without the sacrifice of any of its substantial benefits and advantages.

In the broader aspect of the invention, it is immaterial whether the box neck is made or constructed on the form or whether it is made otherwise and applied to the form ready for the subsequent building of the box structure over it. In some cases, it may be preferable not to rotate the glue roller 176 by power, in which case, the mechanism for doing so, is, of course, omitted.

I claim:

1. In a machine of the character described, the combination of an angular form, means to make a neck of a single layer of body material on said form, said neck having a strip of finish-material folded over both sides and an edge of the neck, means to make a box-body of a single layer of body-material around the neck on said form, and means to discharge the necked body from said form, substantially as described.

2. In a machine of the character described, the combination of an angular form, means to make a neck of a single layer of body material on said form, said neck having a strip of finish-material folded over an edge and secured to both sides thereof, means to make a box-body around the neck on the form, said body comprising a rim composed of a single thickness of body-material, a bottom, and a binder-strip uniting the rim and bottom and bent over the upper edge of said rim and secured to its inner face, and means to discharge the necked body from the form, substantially as described.

3. In a machine of the character described, the combination of an angular movable form, means to move said form, means to make a neck of a single layer of body material on said form in one position of the latter, said neck having a finish-strip folded over an edge thereof and secured to its opposite faces, means to make a box-body over said covered neck on the form while the form and neck are in a different position, and means to discharge the necked body, substantially as described.

4. In a machine of the character described, the combination of an angular movable form, means to move said form, means to make a neck of a single layer of body-material on said form in one position of the latter, said neck being provided with a finish-strip folded over an edge and adhered to opposite faces thereof, means to make a box-body over said neck on the form while the form and neck are in a different position, said box-body comprising a rim composed of a single thickness of body material, a bottom, and a binder strip uniting the bottom and rim, said binder strip being folded over the upper edge of said rim and folded over on to and adhered to said bottom, and means to discharge the necked body from the form, substantially as described.

5. In a machine of the character described, the combination of an angular form, means to make a flat duplex neck blank comprising a strip of pasteboard and a strip of finish material folded over an edge of the pasteboard strip and adhered to its opposite faces, means to fold a single thickness of said duplex neck blank around said form, means to make a box-body around said neck on the form, and means to discharge the necked body, substantially as described.

6. In a machine of the character described, the combination of an angular form, means to make a flat duplex neck-blank of pasteboard and finish-material with the finish-material folded over an edge of the pasteboard and secured to its opposite faces, means to bend a single thickness of said duplex neck-blank around the form to provide a neck, means to feed a rim-blank, means to feed a bottom-blank, means to feed a binder-strip, means to make a box-body over said neck on the form from said rim and body blanks and binder-strip, and means to discharge the necked box-body, substantially as described.

7. In a machine of the character described, the combination of a form, means to move said form intermittently, means to feed a flat neck-blank, means to fold a single thickness of said neck-blank around the form while the latter is stationary to provide a neck, means to make a box-body around said neck on the form in another position of the form, and means to discharge the necked body, substantially as described.

8. In a machine of the character described, the combination of a form, means to move said form intermittently, means to feed a flat neck-blank, means to fold a single thickness of said neck-blank around the form while the latter is stationary to provide a neck, means to feed a rim-blank, means to feed a bottom-blank, means to feed a binder-strip, means to make a box-body from said rim and bottom blanks and binder-strip on said neck on the form in another position of the form, and means to discharge the necked body from the form, substantially as described.

9. In a machine of the character described, the combination of a form, means to revolve said form on its own axis, means to feed a flat neck-blank, means to fold said neck-blank around the form while the latter is stationary to provide a neck, means to make a box-body over the neck on the form during rotation of the latter, and means to discharge the necked body from the form, substantially as described.

10. In a machine of the character described, the combination of a form, means to move said form intermittently, means to revolve said form on its own axis, means to feed a flat neck-blank, means to fold said neck-blank around the form while the latter is stationary to provide a neck, means to make a box-body over the neck on the form in another position of the latter during its rotation on its own axis, and means to discharge the neck body, substantially as described.

11. In a machine of the character described, the combination of a form, means to move said form intermittently, means to feed a flat neck-blank, means to fold the neck-blank around the form while the latter is stationary, means to feed a rim-blank, means to feed a bottom-blank, means to feed a binder-strip, means to revolve said form on its own axis, and means to make a box-body over the neck on the form from said rim and bottom blanks and binder-strip in another position of the form and during rotation of the form on its own axis, substantially as described.

12. In a construction of the character described, the combination of a form, a continuous web of pasteboard of a width equal to the length of the neck-blank to be produced, a continuous web of finish-material, means to sever blanks from said pasteboard web, means to sever blanks from said finish-material web, means to form a duplex neck strip from said blanks, means to bend said duplex blank around the form to provide a neck, means to make a box-body over said neck on the form, and means to discharge the necked box, substantially as described.

13. In a machine of the character described, the combination of a form, a continuous web of pasteboard of a width equal to the length of the neck-blank to be produced, a continuous web of finish-material, means to sever blanks from said pasteboard web, means to sever blanks from said finish-material web, means to form a duplex neck strip from said blanks, means to bend said duplex blank around the form to provide a neck, means to make a box-body over said neck on the form comprising a rim, a bottom, and a binder-strip uniting the rim and bottom and means to discharge the necked box from the form, substantially as described.

14. In a machine of the character described, a form, means to make a flat duplex neck-blank of paste board and finish-material with the latter folded over an edge of and against the opposite faces of the pasteboard blank, means to bend a single thickness of said duplex blank around the form, means to make a duplex rim-blank of pasteboard and binder with the binder folded over one edge of the rim-blank and extended beyond the other edge, means to feed a bottom-blank, and means to make a box-body on said form over the neck from a single thickness of said duplex rim and bottom blanks with the extended portion of the binder bent over and adhered to the bottom, substantially as described.

15. In a machine of the character described, the combination of a form, a continuous web of pasteboard of a width equal to the length of the neck-blank to be provided, a continuous web of finish-material, means to sever blanks from said pasteboard web, means to sever blanks from said finish-material web, means to form a duplex neck strip from said blanks, means to bend said strip around the form to provide a duplex strip around the form to provide a neck, means to make a duplex rim-blank of pasteboard and binder with the binder folded over one edge of the rim-blank and extended beyond the other edge, means to feed a bottom-blank, and means to make a box-body on said form over the neck from said duplex rim blank and bottom blanks with the extended portion of the binder bent over and adhered to the bottom, substantially as described.

16. In a machine of the character described, the combination of a form, a continuous web of pasteboard of a width equal to the length of the neck-blank to be produced, a continuous web of finish-material, means to sever blanks from said pasteboard web, means to sever blanks from said finish-material web, means to form a duplex neck strip from said blanks with the strip of finish-material folded over an edge of the pasteboard blank and adhered to its opposite faces, means to bend said duplex blank around the form to provide a neck, a continuous web of rim pasteboard of a width equal to the length of the rim of the box body to be produced, a continuous web of binder-material, means to sever blanks from binder-material web, means to sever said rim pasteboard web, means to sever blanks from said binder web, means to form a duplex rim-blank from said severed blanks, means to feed a bottom-blank, and means to make a box-body on said form over the neck from said duplex and bottom blanks with the extended portion of the binder bent over and adhered to the bottom, substantially as described.

17. In a construction of the character described, the combination of a movable form, means to move said form, means to produce a flat duplex neck blank out of the path of travel of said form, said neck comprising a strip of foundation-material, and a strip of finish-material folded over an edge of said foundation-material and adhered to its opposite faces, means to bend a single thickness of said duplex-blank around the form to provide a neck thereon, means to produce a flat body rim blank out of the path of travel of the form, said blank comprising a foundation-strip and an attached binder-strip, means to feed a bottom, and means to build a box-body from a single thickness of said duplex rim-blank and bottom over the neck on the form, substantially as described.

18. In a construction of the character described, the combination of a plurality of angular forms, means to intermittently move said forms in an endless path, means to construct necks with a single thickness of body material on said forms in succession, means to build box-bodies with a single thickness of body material in succession over the necks on the forms, and means to discharge the necked bodies in succession, substantially as described.

19. In a construction of the character described, the combination of a plurality of angular forms, means to intermittently move said forms in an endless path, means to revolve said forms on their own axes, means to construct necks with a single thickness of body material on said forms in succession, means to build box bodies with a single thickness of body material in succession over the necks on the forms during the rotation of the latter on their own axes, and means to discharge the necked bodies, substantially as described.

20. In a construction of the character described, the combination of a roll-supply of foundation-material, a roll supply of finish-material, means to sever blanks from said foundation-material roll, means to sever blanks from said finish material roll, means to apply adhesive to the latter severed blanks, and means to feed the severed blanks from both supply-rolls into contact forming duplex blanks, substantially as described.

21. In a construction of the character described, the combination of a roll-supply of foundation-material, a roll-supply of finish-material, means to successively sever blanks from said foundation-material supply-roll, means to successively sever blanks from said finish-material supply-roll, a feed-cylinder, means to grip the finish-blanks to said cylinder, means to operate said cylinder, means to apply adhesive to the finish-blanks while on said cylinder, means to feed the two kinds of severed blanks and bring them together producing duplex blanks, substantially as described.

22. In a construction of the character described, the combination of a roll-supply of foundation-material, a roll-supply of finish-material, means to sever blanks from said foundation-material roll, means to sever blanks from said finish-material roll, means to apply adhesive to one of said sets of severed blanks, means to feed the severed blanks from both supply rolls into contact forming duplex blanks, a form, means to feed bottoms, and means to construct box-bodies on the form from said duplex blanks and bottoms, substantially as described.

23. In a construction of the character described, the combination of a roll-supply of foundation-material, a roll-supply of finish-material, means to successively sever blanks from said foundation-material supply-roll, means to successively sever blanks from said finish-material supply-roll, a feed-cylinder, means to grip the finish-blanks to said cylinder, means to operate said cylinder, means to apply adhesive to the finish-blanks while on said cylinder, means to feed the two kinds of severed blanks and bring them together producing duplex blanks, a form, means to feed bottoms, and means to construct box bodies on said form from said duplex blanks and bottoms, substantially as described.

24. In a machine of the character described, the combination of an angular form adapted to support a neck, means to provide such form with a neck, means to feed a box-body bottom to the form, means to feed a flat duplex rim-blank to the form, said blank comprising a strip of foundation-material and a binder-strip bent over an edge of said foundation-strip and adhered to its opposite faces, and means to bend a single thickness of said duplex-strip around the form, neck, and bottom, and secure the binder-strip to said bottom, substantially as described.

25. In an appliance of the character described, the combination of a supply roll of sheet material, means to feed the material from said roll, means to sever a blank from the advance end of the material unwinding from said roll, a feed roller arranged with its plane transverse to the longitudinal dimension of said sheet material, means to raise and lower said feed roller, and means to feed the severed blank longitudinally of the sheet material beneath said feed roller, substantially as described.

26. In an appliance of the character described, the combination of a supply roll of sheet material, a feed cylinder whose plane is substantially parallel to the axis of said roll, means to feed the material from said roll, means to sever blanks from the advance end of said unwinding sheet, gripping means for said cylinder, means to feed the blanks to the lower portion of said cylinder for gripping thereto, and means to release the inverted blanks at the top portion of said cylinder, substantially as described.

27. In an appliance of the character described, the combination of an angular form, means to wrap a neck blank once around the form, means to feed a head blank to the form against the edge of said neck, means to wrap a rim blank once around the neck with its flat surface against the edge of the head, and means to fasten the rim and head together by a binder strip, substantially as described.

28. In an appliance of the character described, the combination of an angular form, means to wrap a neck blank around the form, means to feed a head blank to the form, means to wrap a duplex rim blank once around the form, neck, and head, with a portion of the neck projecting beyond the edge of the rim remote from the head, and means to apply one portion of the duplex rim to the head, substantially as described.

29. In an appliance of the character described, the combination of a form, means to grip a rim blank thereto, means to revolve the form on its own axis to wrap the blank around the form, a stationary ledge adapted to support the flat blank preliminary to the wrapping operation, a spring-pressed arm adapted to press the blank on the ledge, and means to operate said arm, substantially as described.

30. In an appliance of the character described, the combination of a form, means to grip a rim blank thereto, means to revolve the form on its axis to wrap the blank around the form, a stationary ledge adapted to support the flat blank preliminary to the wrapping operation, an arm adapted to press the blank on the ledge, a spring acting on said arm tending to force it toward the ledge, and cam means to move said arm away from the ledge, substantially as described.

FREDERICK WILLIAM LAENCHER.

Copies of this patent may be obtained for five cents each, by addressing the "Commissioner of Patents, Washington, D. C."